United States Patent [19]
Moya

[11] Patent Number: 5,976,380
[45] Date of Patent: Nov. 2, 1999

[54] ARTICLE OF MANUFACTURE INCLUDING A SURFACE MODIFIED MEMBRANE AND PROCESS

[75] Inventor: Wilson Moya, Derry, N.H.

[73] Assignee: Millipore Corporation, Bedford, Mass.

[21] Appl. No.: 08/846,867

[22] Filed: May 1, 1997

[51] Int. Cl.⁶ .................................................. B01D 61/18
[52] U.S. Cl. ................... 210/650; 210/490; 210/321.75; 210/500.21; 210/500.27; 427/244
[58] Field of Search .................................. 427/243, 244; 210/490, 493.1, 493.5, 321.75, 321.77, 650, 653, 654, 500.21, 500.27; 428/315.5, 315.7, 308.4, 316.6, 315.9

[56] References Cited

U.S. PATENT DOCUMENTS

| | | | |
|---|---|---|---|
| 3,692,569 | 9/1972 | Grot | 117/128.8 UF |
| 4,112,149 | 9/1978 | Babinsky | 427/34 |
| 4,181,592 | 1/1980 | Babinsky | 204/283 |
| 4,259,226 | 3/1981 | Suhara et al. | 260/33.4 F |
| 4,327,010 | 4/1982 | Suharu et al. | 524/388 |
| 4,344,999 | 8/1982 | Gohlke | 428/212 |
| 4,348,310 | 9/1982 | Silva et al. | 524/167 |
| 4,385,150 | 5/1983 | Miyake et al. | 524/389 |
| 4,386,987 | 6/1983 | Covitch et al. | 156/155 |
| 4,433,082 | 2/1984 | Grot | 524/755 |
| 4,453,991 | 6/1984 | Grot | 156/94 |
| 4,470,859 | 9/1984 | Benezra et al. | 156/155 |
| 4,707,266 | 11/1987 | Degen et al. | 210/638 |
| 4,720,334 | 1/1988 | DuBois et al. | 204/296 |
| 4,902,308 | 2/1990 | Mallouk et al. | 55/16 |
| 4,917,793 | 4/1990 | Pitt et al. | 210/94 |
| 4,954,388 | 9/1990 | Mallouk et al. | 428/198 |
| 5,026,591 | 6/1991 | Henn et al. | 428/198 |
| 5,066,403 | 11/1991 | Dutta et al. | 210/638 |
| 5,082,472 | 1/1992 | Mallouk et al. | 55/16 |
| 5,094,895 | 3/1992 | Branca et al. | 428/36.91 |
| 5,104,425 | 4/1992 | Rao et al. | 55/16 |
| 5,114,515 | 5/1992 | Birdwell et al. | 156/155 |
| 5,183,545 | 2/1993 | Branca et al. | 204/252 |
| 5,190,813 | 3/1993 | Ohashi et al. | 428/319.3 |
| 5,232,600 | 8/1993 | Degen et al. | 210/640 |
| 5,258,202 | 11/1993 | Pellegrino et al. | 427/235 |
| 5,279,856 | 1/1994 | Koyama et al. | 427/246 |
| 5,288,384 | 2/1994 | Banerjee | 204/252 |
| 5,342,521 | 8/1994 | Bardot et al. | 210/490 |
| 5,417,832 | 5/1995 | Pellegrino et al. | 204/296 |
| 5,458,719 | 10/1995 | Pall et al. | 156/285 |
| 5,463,005 | 10/1995 | Desmarteau | 526/240 |
| 5,547,551 | 8/1996 | Bahar et al. | 204/296 |
| 5,547,760 | 8/1996 | Tarbet et al. | 428/471 |

FOREIGN PATENT DOCUMENTS 0 203 577 A2  12/1986  European Pat. Off. .
WO 90/08218   7/1990   WIPO .

*Primary Examiner*—W. L. Walker
*Assistant Examiner*—Terry K. Cecil
*Attorney, Agent, or Firm*—J. Dana Hubbard; Timothy J. King; Paul J. Cook

[57] ABSTRACT

A filtration device is provided which includes a housing containing a porous membrane formed of a porous membrane substrate having its exposed surface completely modified with a perfluorocarbon copolymer composition. The porous membrane has substantially the same permeability as the porous membrane substrate.

34 Claims, 9 Drawing Sheets

ARTICLE OF MANUFACTURE INCLUDING A SURFACE MODIFIED MEMBRANE AND PROCESS

BACKGROUND OF THE INVENTION

1. Field of the Invention

This invention relates to an article of manufacture incorporating a membrane having its surface modified with a perfluorocarbon polymeric composition, to a process for making the article of manufacture and to a filtration process utilizing the article of manufacture.

2. Description of Prior Art

Porous membrane filters are utilized in a wide variety of environments to separate materials within a fluid stream. Membranes are formed from a solid polymeric matrix and have highly precisely controlled and measurable porosity, pore size and thickness. In use, the membrane filters generally are incorporated into a device such as a cartridge which, in turn, is adapted to be inserted within a fluid stream to effect removal of particles, microorganisms or a solute from liquids and gases.

To be useful, membrane filters must be resistant to the fluid being filtered so that it maintains its strength, porosity, chemical integrity and cleanliness. For example, in the manufacture of microelectronic circuits, membrane filters are used extensively to purify various process fluids to prevent contaminants from causing circuit failures. Fluid filtration or purification is usually carried out by passing the process fluid through the membrane filter under a differential pressure across the membrane which creates a zone of higher pressure on the upstream side of the membrane than on the downstream side. Thus, fluids being filtered in this fashion experience a pressure drop across the membrane filter. This pressure differential also results in the fluid on the upstream side having a higher level of dissolved gases than the fluid on the downstream side. This occurs because gases, such as air, have greater solubility in liquids at higher pressures than in liquids at lower pressures. As the liquid passes from the upstream side of the membrane filter to the downstream side, dissolved gases come out of solution in the membrane resulting in outgassing of the fluid. Outgassing of a liquid can also occur spontaneously without a pressure differential as long as the liquid contains dissolved gases and there is a driving force for the gases to come out of solution, such as nucleating sites on the surfaces of a membrane where gas pockets can form and grow. Outgassing fluids typically used in the manufacture of semiconductors and microelectronic devices usually include very high purity water, ozonated water, organic solvents such as alcohols, and others which are generally significantly chemically active, such as concentrated and aqueous acids or bases which can contain an oxidizer. These chemically active fluids require the use of a chemically inert filter to prevent membrane degradation. Membrane degradation leading to the chemical breakdown of the membrane composition usually results in extractable material which is released from the filter during use, thus compromising the purity, integrity and cleanliness of the fluid being filtered. Fluorocarbon-based membrane filters made from fluorine-containing polymers such as polytetrafluoroethylene are commonly utilized in these applications. Fluorine-containing polymers are well known for their chemical inertness, or excellent resistance to chemical attack. One disadvantage of fluorine-containing polymers is that they are hydrophobic and therefore membranes made from such polymers are difficult to wet with aqueous fluids or other fluids which have surface tensions greater than the surface energy of the membrane. Another problem often encountered during the filtration of outgassing fluids with a hydrophobic membrane filter is that the membrane provides nucleating sites for dissolved gases to come out of solution under the driving force of the pressure differential, during the filtration process. Gases which come out of solution at these nucleating sites on the hydrophobic membrane surfaces, including the interior pore surfaces and the exterior or geometric surfaces, form gas pockets which adhere to the membrane. As these gas pockets grow in size due to continued outgassing, they begin to displace fluid from the pores of the membrane ultimately reducing the effective filtration area of the membrane. This phenomenon is usually referred to as dewetting of the membrane filter since the fluid-wetted, or fluid-filled portions of the membrane are gradually converted into fluid-nonwetted, or gas-filled portions. Dewetting of a membrane can also occur spontaneously when a wet membrane, such as a hydrophobic membrane wet with an aqueous fluid, is exposed to a gas such as air. It has been found that this dewetting phenomenon occurs more frequently and is more pronounced in fluorocarbon-based membranes made from fluorine-containing polymers such as polytetrafluoroethylene. It has also been found that the rate at which dewetting occurs is greater in small pore size membranes such as 0.2 microns or less, than in larger pore size membranes. During a filtration process the reduction of effective membrane area available for filtration due to dewetting of the membrane in a filter device results in a reduction of the overall filtration efficiency of the filter. This reduced efficiency manifests itself in a reduction in fluid flow rate through the filter at a given pressure drop or in an increase in pressure drop at a given flow rate. Thus, as the membrane filter dewets with time, the user is not able to purify or filter the same volume of process fluid per unit time as when the filter was newly installed and therefore completely wet. This reduction of the overall throughput capability of the filtration process results in an increase in the user's time and cost to purify a unit volume of process fluid. Faced with a throughput reduction, the user is often required to install new filters in the process and to discard the dewet filters. This premature filter changeout due to dewetting and not necessarily due to the exhaustion of the filter's dirt-holding capacity results in unscheduled downtime and increases the user's overall cost. Optionally, the user can compensate for the reduction in efficiency by making adjustments to other elements of the filtration system such as increasing the speed at which a pump forces fluid through the filter to increase the pressure drop across the membrane, thus maintaining a constant flow rate. These adjustments also translate into higher operating costs for the user and increases the potential for malfunction of the other elements in the system as well as the potential for a process fluid spill due to the increased processing pressures. Another option for the user to avoid premature filter changeout due to dewetting is to treat the filter to rewet the membrane. The treatment is time consuming since it requires that the filter device be removed from the filtration system resulting in unscheduled downtime and can often result in the introduction of contaminants derived from the rewetting process into the process fluid passing through the filter. Typically, a low surface tension rewetting agent may be used, including alcohols such as isopropanol, which are flammable liquids that cause safety concerns. Prior to placing the filtration device back into service, the end user rewets the dewet filter with the alcohol followed by a water flush and then a flush with the process fluid. While membrane manufacturers may have the expertise for handling and treating dewet filters, end users may not have the capabilities or the desire to perform such additional costly processing steps.

All membranes are characterized by nominal pore size which is directly related to the membrane's particle retention characteristics. Pore size is directly proportional and particle retention is inversely proportional to flow rate through the membrane. It is desirable to maximize both particle retention and flow rate. Significantly increasing one of these characteristics while significantly reducing the other of these characteristics is undesirable.

U.S. Pat. No. 4,470,859, to Benezra et al., discloses a process for modifying the surfaces of microporous substrates formed of a fluorocarbon such as polytetrafluoroethylene, with a coating of a perfluorocarbon copolymer from a solution of the copolymer to render the surface of the membrane more water wettable. The perfluorocarbon copolymer is dissolved in a solvent at elevated temperature. The membrane then is immersed into the solution which, in turn, is placed into a vacuum chamber. The pressure within the chamber then is reduced such as to approximately 150 millimeters of mercury (absolute) to remove air from within the filter. Thereafter, the pressure within the chamber is quickly returned to atmospheric pressure. This coating process is repeated to ensure, what is describe by Benezra et al., complete solution penetration into the pores of the membrane. By proceeding in this manner, the membrane surfaces and the interior walls defining the interstices within the membrane are coated with the perfluorocarbon copolymer. Following the coating step, the solvent is removed by evaporation using heat and vacuum, or the solvated perfluorocarbon copolymer is precipitated with a substance in which the copolymer is effectively insoluble. The solvents utilized to form the solution include halocarbon oil, perfluorooctanoic acid, decafluorobiphenyl, N-butylacetamide, and N,N-dimethylacetamide. Subsequent to modifying the membrane surface, Benezra et al, teaches avoiding the use of a fluid containing a solvent for the modifying copolymer on the membrane surface. Benezra et al. also discloses that alcohol solutions of the polymer should be avoided.

U.S. Pat. Nos. 4,433,082 and 4,453,991 disclose a process for forming solutions of a perfluorinated ion exchange polymer such as copolymers of tetrafluoroethylene and methyl perfluoro (4,7-dioxa-5-methyl-8-nonenoate) or perfluoro (3,6-dioxa-4-methyl-7-octene sulfonyl fluoride) utilizing solvents which are relatively innocuous as compared to the solvents utilized in the coating process set forth above. The perfluorinated ion exchange polymers are dissolved in alcoholic solvents such as isopropanol at elevated temperature and pressure. The solutions obtained are disclosed as being useful in making and repairing films and non-porous membranes used in electrolytic processes such as aqueous sodium chloride electrolysis, in coating substrates such as catalyst supports for use in promoting a wide variety of chemical reactions, for coating porous diaphragms to convert them into non-porous articles and in recovering used perfluorinated polymers having sulfonic acid or sulfonate functional groups for reuse. In electrolytic processes, such as disclosed by these patents, extractables derived from the coated diaphragms are not a substantial concern and the degree of porosity of the modified diaphragm is unimportant.

Solutions of sulfonyl fluoride-containing fluoropolymers are also disclosed in U.S. Pat. No. 4,348,310. The solvents utilized therein are completely halogenated, saturated hydrocarbons, preferably having at least one terminal sulfonyl fluoride polar group. The solutions are disclosed as being used to repair holes in membranes made from fluorinated polymers and for making ion exchange film membranes, dialysis membranes, ultrafiltration and microfiltration membranes. Another disclosed use for these solutions is to coat porous diaphragms for electrochemical cells by contacting a diaphragm with the solution followed by evaporating the halogenated solvent and then hydrolyzing the coated diaphragm to convert the sulfonyl fluoride groups to the acid or salt form.

U.S. Pat. No. 4,902,308 to Mallouk et al, also describes a process for modifying the surface of a porous, expanded polytetrafluoroethylene membrane with a perfluoro-cation exchange polymer from a solution of the polymer. Mallouk et al, also teaches that contact of the surface modified membrane with fluids containing a solvent for the polymer also should be avoided.

U.S. Pat. Nos. 4,259,226 and 4,327,010 disclose modifying a porous membrane surface with a fluorinated polymer having carboxylic acid salt groups. No process steps are disclosed for controlling extractables from the membrane or for controlling the extent of binding of the modifying composition to the membrane surface.

U.S. Pat. Nos. 5,183,545 and 5,094,895 disclose a process for making a multilayer, composite, porous diaphragm from a porous, multilayer, expanded polytetrafluoroethylene substrate having its surface modified with a perfluoro ion exchange polymer composition. The modifying polymer composition can contain a surfactant and may contain excess modifying composition, both of which are sources of undesirable extractables. In addition, these patents disclose a process for coating a thick polyfluorocarbon diaphragm having a thickness exceeding 0.25 mm, preferably between about 0.76 mm and about 5.0 mm with a perfluoro ion exchange polymer. Thin membrane substrates are specifically excluded as are the use of perfluoro ion exchange coatings having an equivalent weight greater than 1000.

Attempts to produce a device utilizing surface modified fluorocarbon membranes, together with a housing sealed to the surface modified membrane have met with problems. Since adhesives used for sealing comprise a source of extractables, their use is avoided. Thus, sealing methods which utilize molten portions of a housing to which the membrane is sealed to prevent fluid bypass are preferentially used. The heat derived from the molten portion of the housing available by conventional sealing methods sometimes degrades a portion of the modifying composition of the surface modified membrane which discolors at the seal with the housing and which can provide a source of undesirable extractables.

Accordingly, it would be desirable to provide porous membranes having a modified surface which improves its wettability characteristics. In addition, it would be desirable to provide such a membrane which is resistant to chemical attack, such as a porous membrane formed of a fluorine-containing polymer. Furthermore, it would be desirable to provide such a membrane which does not promote nucleation of gases on its surfaces when filtering outgassing fluids such that it does not dewet during use. Also, it would be desirable to provide such a membrane having improved particle retention characteristics as compared to an unmodified membrane without significantly adversely affecting the flux characteristics of the resulting membrane, particularly with small pore size membranes. Moreover, it would be desirable to provide an article of manufacture for filtering a fluid which comprises a chemically inert, surface modified porous membrane sealed to a housing, which is substantially free of undesirable extractables.

SUMMARY OF THE INVENTION

The present invention provides an article of manufacture useful for filtering a fluid and which includes a thin porous polymeric membrane substrate having its surfaces, including the interior pore surfaces and the exterior, geometric surfaces, completely modified with a deposited and bound perfluorocarbon copolymer composition. The perfluorocarbon copolymer composition is deposited in a manner so that it is bound to the substrate surfaces. A solution of the perfluorocarbon copolymer composition is contacted with the polymer substrate such as by immersion of the substrate in the solution or by passing the solution through the substrate under pressure or by intruding the membrane pores under pressure. By a solution herein is meant a liquid composition which contains a completely dissolved and/or partially dissolved perfluorocarbon copolymer composition in a solvent or diluent medium. These solutions include suspensions of an undissolved perfluorocarbon copolymer composition in a dispersant medium. The solution includes a liquid composition which is a solvent, diluent or dispersant medium for the perfluorocarbon copolymer composition which either completely wets the membrane substrate or, when it does not wet the membrane substrate, the membrane is prewet so that the solution can enter the membrane pores. It is a requirement that the solution completely enter the membrane pores. The surface modified membrane substrate then can be contacted with a solvent, diluent or dispersant which selectively removes, such as by solvation or dilution, unbound perfluorocarbon copolymer composition while avoiding removal of perfluorocarbon copolymer composition which is bound to the membrane substrate. Alternatively, the surface modified membrane substrate can be subjected to a mechanical force to selectively remove excess unbound perfluorocarbon copolymer composition and to distribute it over the surface of the substrate. The resultant surface modified membrane then is dried and heat treated to improve the strength of binding between the membrane substrate and the bound perfluorocarbon copolymer composition.

The heat-treated surface modified membrane has its surface completely modified with a composition comprising a bound perfluorocarbon copolymer composition which, surprisingly, is not substantially soluble in solvents or diluents which solvate and/or dilute the unbound solvated perfluorocarbon copolymer composition. By the term "completely modified" as used herein is meant that the extent of surface modification is such that dewetting of the membrane can be detected when the membrane is contacted with an outgassing liquid and that, when the membrane is stained with Methylene Blue dye, no unstained portion of the membrane surface is detected. Excess or unbound perfluorocarbon copolymer composition can be selectively removed from the modified membrane without adversely affecting the modified membrane surface. In addition, since the unbound perfluorocarbon copolymer composition is removed from the membrane, it is no longer a possible source of extractables which can be released in a fluid being passed through the surface modified membrane. Thus, the surface modified membranes of the invention are substantially free of extractables even when a liquid which is a solvent or diluent for unbound solvated perfluorocarbon copolymer composition contacts the membrane. It is preferred that the surface modified membrane is substantially uniformly modified with the modifying composition so that the amount of perfluorocarbon copolymer composition per unit area of the membrane is substantially the same over the entire surface of the modified membrane. The subsequent treatment with a solvent or diluent to remove excess unbound perfluoro copolymer composition promotes substantially uniform and complete modification of the substrate surface with bound perfluorocarbon copolymer composition. In addition, the surface modifying composition is utilized in amounts and concentrations so that the porous membrane substrate is not substantially blocked or plugged as determined by measuring an increase in pressure drop across the membrane during filtration of purified water. The modified porous membrane product of this invention has substantially the same permeability as measured by pressure drop as the unmodified porous membrane substrate. That is, this pressure drop does not exceed an increase of greater than 25% as compared to the pressure drop across the unmodified porous membrane substrate with the modified porous membrane of this invention. Perferably, this pressure drop increase does not exceed 15% and, most preferably, does not exceed 10% as compared to the pressure drop across the unmodified porous membrane substrate.

The article of manufacture of this invention is provided which utilizes the surface modified membrane to render the membrane useful in many conventional filtration processes. The surface modified membrane is sealed within a housing which prevents fluid feed to be filtered from mixing with filtrate. The portion of the membrane sealed to the housing is unexposed to the fluid feed and the exposed, non-sealed portion of the membrane is surface modified with the perfluorocarbon copolymer composition.

The article of manufacture of this invention is formed by sealing a portion of the membrane in a manner so that fluid feed contacting the exposed portion of the membrane either passes through the membrane or is retained by the membrane thereby to prevent bypass of the fluid around the membrane. In one embodiment of this invention, the membrane substrate is sealed in position prior to having its surface modified with a perfluorocarbon copolymer composition. The exposed membrane portion, while supported, is contacted on one of its surfaces with a solution of the perfluorocarbon copolymer composition. The exposed portion of the membrane then is subjected to a differential pressure between the surfaces of the membrane such that a zone of high pressure is effected at the membrane surface in contact with the solution. The membrane can be supported on a porous support during the time it is subjected to the differential pressure to avoid membrane rupture. The solution is passed through the membrane under conditions to effect deposition and binding of the perfluorocarbon copolymer composition onto the surfaces of the membrane. The retention and flux characteristics of the resultant membrane can be controlled by controlling the thickness of the deposited layer on the membrane. The thickness of the deposited layer, in turn, is controlled by controlling the concentration of the solution, the volume of the solution passed through the membrane and the flow rate of the solution passing through the membrane during the deposition step. In another embodiment of this invention, the membrane substrate is first deposited thereon with a perfluorocarbon copolymer composition. It is then sealed to a housing in the manner set forth above while minimizing exposure of the surface modified membrane to excess heat.

The modified membrane utilized in the present invention can have the particle retention properties of unmodified membranes of much smaller pore size while substantially maintaining the flux characteristics of the unmodified substrate. Furthermore, since the composition effecting surface modification of the membrane is formed from a perfluorocarbon copolymer composition, the modified surface is also highly resistant to chemical attack. In addition, the perfluorocarbon copolymer composition does not promote the nucleation of gases on the surfaces of the membrane when filtering an outgassing liquid. Thus, when filtering an outgassing liquid, the effective life of the membranes is significantly greater than the effective life of unmodified fluorocarbon membranes which promote the nucleation of gases on their surfaces when filtering an outgassing liquid resulting in dewetting of the membrane.

DESCRIPTION OF THE SPECIFIC EMBODIMENTS

Figure 1:
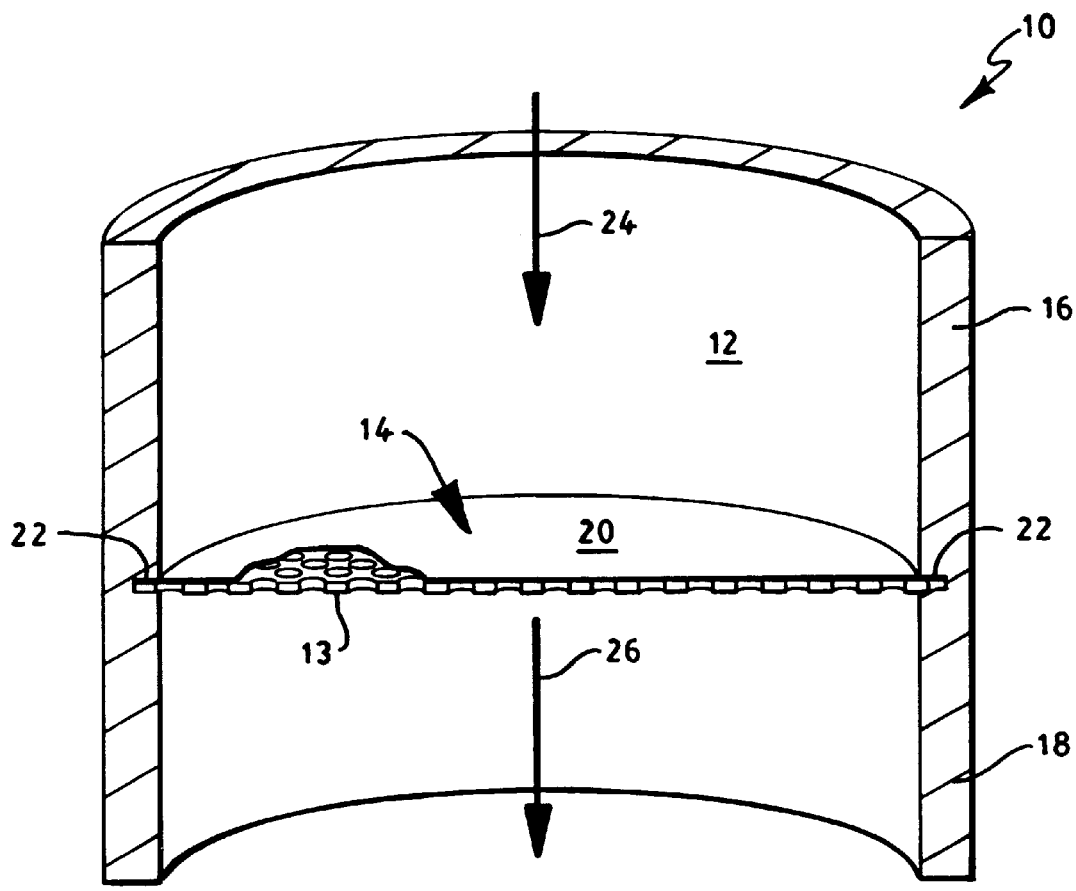
FIG. 1 is a perspective view, in partial cross section of an article of manufacture of the invention.

The surface modifying composition of the membrane of this invention comprises a polymer composition known generally as perfluorocarbon copolymers such as those marketed by E. I. Dupont de Nemours and Company, Inc. under the name NAFION® or by Asahi Glass Company, Limited under the name FLEMION™, which is bound to the membrane substrate.

These perfluorocarbon copolymers are generally co-polymers of at least two monomers with one monomer being selected from a group of fluorine-containing monomers such as vinyl fluoride, hexafluoropropylene, vinylidene fluoride, trifluoroethylene, chlorotrifluoroethylene, perfluoro(alkylvinyl ether), tetrafluoroethylene and mixtures thereof.

The second monomer is selected from a group of fluorine-containing monomers containing functional groups which can be or which can be converted to ($SO_2F$), ($SO_3M$), ($SO_3R$), ($SO_2NR_2$), (COF), ($CO_2M$), ($CO_2R$) or ($CONR_2$) groups wherein M is H, an alkali metal, an alkaline earth metal, or $NR_4$ and each R separately is H, an alkyl group or an aryl group such as $CH_3$, $C_2H_5$ or $C_6H_5$, which may, optionally, contain other functional groups such as hydroxyl, amine, ether or carbonyl groups or the like to form substituted alkyl or substituted aryl groups. Examples of such second monomers can be generically represented by the formula $CF_2=CFR_f-X$. $R_f$, in the generic formula is a linear or branched bifunctional perfluorinated radical comprising one to eight carbon atoms of any suitable or conventional configuration including those containing ether linkages and which is attached to the vinyl radical $CF_2=CF$ group directly through a carbon-carbon bond or preferably through an ether linkage. X, in the generic formula is a functional group which can be or which can be converted to an ($SO_2F$), ($SO_3M$), ($SO_3R$), ($SO_2NR_2$), (COF), ($CO_2M$), ($CO_2R$) or a ($CONR_2$) group wherein M is H, an alkali metal, an alkaline earth metal, or $NR_4$ and each R separately is H, an alkyl group or an aryl group such as $CH_3$, $C_2H_5$ or $C_6H_5$, or a substituted alkyl or substituted aryl group. One restraint upon the generic formula is a general requirement for the presence of at least one fluorine atom on the carbon atom adjacent the —X group.

Typically said second monomers containing sulfonyl fluoride groups which can be converted to sulfonyl based ion exchange groups are set forth in U.S. Pat. Nos. 3,282,875; 3,041,317; 3,560,568; 3,718,627 which are incorporated herein by reference and methods of preparation of perfluorocarbon copolymers are set forth in U.S. Pat. Nos. 3,041,317; 2,393,967; 2,559,752 and 2,593,583 which are incorporated herein by reference. These perfluorocarbon copolymers generally have pendant $SO_2F$ based functional groups which can be converted to ($SO_3M$) groups. In one embodiment of this invention, the surface modifying composition includes pendant carbonyl based functional groups which can be converted to carbonyl based ion exchange groups.

Perfluorocarbon copolymers having pendant carbonyl based ion exchange functional groups can be prepared in any suitable conventional manner such as in accordance with U.S. Pat. No. 4,151,052 or Japanese patent application No. 52(1977)38486 which are incorporated herein by reference or polymerized from a carbonyl functional group containing a monomer derived from a sulfonyl group containing monomer by a method such as is shown in U.S. Pat. No. 4,151,051 which is incorporated herein by reference. Illustrative examples of carbonyl fluoride containing monomers include

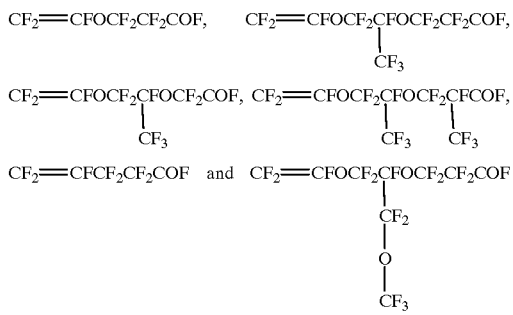

Preferred carbonyl containing monomers include

-continued

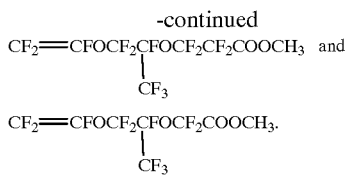

Preferred perfluorocarbon copolymers utilized in the present invention therefore include carbonyl and/or sulfonyl based functional groups represented by the formula —OCF$_2$CF$_2$X' and/or —OCF$_2$CF$_2$C—F$_2$Y—B—YCF$_2$CF$_2$O— wherein X' is sulfonyl fluoride (SO$_2$F), carbonyl fluoride (COF) sulfonate methyl ester (SO$_3$CH$_3$), carboxylate methyl ester (COOCH$_3$), ionic carboxylate (COO$^-$Z$^+$) or ionic sulfonate (SO$_3^-$Z$^+$), Y is sulfonyl (SO$_2$) or carbonyl (CO), B is a linkage such as —O—, —O—O—, —S—S—, and di and poly amines of the form NH(CR$_1$R$_2$)$_x$NH where R$_1$, R$_2$ are selected from short chain alkanes, alkenes, hydrogen, and amine groups and Z is hydrogen, an alkali metal such lithium, cesium, rubidium, potassium and sodium or an alkaline earth metal such as barium, beryllium, magnesium, calcium, strontium and radium or a quaternary ammonium ion.

The sulfonyl form of the perfluorocarbon copolymer is typically a polymer having a fluorinated hydrocarbon backbone chain to which are attached the functional groups or pendant side chains which, in turn, carry the functional groups. The pendant side chains can contain, for example,

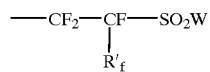

groups wherein R'$_f$ is F, Cl , or a C$_1$ to C$_{10}$ perfluoroalkyl radical, and W is F or Cl, preferably F. Ordinarily, the functional group in the side chains of the polymer will be present in terminal

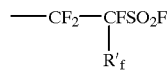

groups which can be attached to the side chain through an ether linkage. Examples of perfluorocarbon copolymers of this kind are disclosed in U.S. Pat. No. 3,282,875, U.S. Pat. No. 3,560,568 and U.S. Pat. No. 3,718,627 which are incorporated herein by reference.

Additional examples can be represented by the general formula CF$_2$=CF—T$_k$—CF$_2$SO$_2$F wherein T is a bifunctional fluorinated radical comprising 1 to 8 carbon atoms, and k is 0 or 1. Substituent atoms in T include fluorine, chlorine, or hydrogen. The most preferred perfluorocarbon copolymers are free of both hydrogen and chlorine attached to carbon, i.e., they are perfluorinated, for greatest stability in harsh environments. The T radical of the formula above can be either branched or unbranched, i.e., straight-chain, and have one or more ether linkages. It is preferred that the vinyl radical in this group of sulfonyl fluoride containing comonomers be joined to the T group through an ether linkage, i.e., that the comonomer be of the formula CF$_2$=CF—O—T—CF$_2$—SO$_2$F. Illustrative of such sulfonyl fluoride containing comonomers are

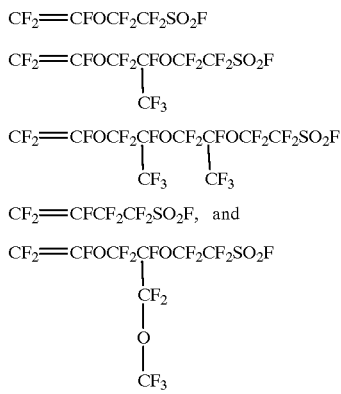

The most preferred sulfonyl fluoride containing comonomer is perfluoro (3,6-dioxa-4-methyl-7-octenesulfonyl fluoride),

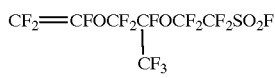

The sulfonyl-containing monomers are disclosed in such references as U.S. Pat. No. 3,282,875, U.S. Pat. No. 3,041,317, U.S. Pat. No. 3,718,627 and U.S. Pat. No. 3,560,568 which are incorporated herein by reference.

A preferred class of perfluorocarbon copolymers utilized in the present invention is represented by polymers having the repeating units

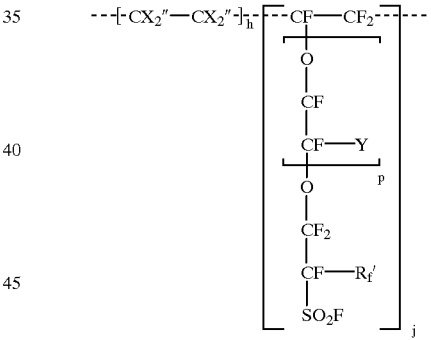

wherein
h is 3 to 15,
j is 1 to 10,
p is 0, 1 or 2,
the X"'s taken together are four fluorines or three fluorines and one chlorine,
Y is F or CF$_3$, and
R'$_f$ is F, Cl or a C$_1$ to C$_{10}$ perfluoroalkyl radical.

Any perfluorocarbon copolymer which contains sulfonyl or carbonyl based functional groups can be used in the process of this invention including copolymers which contain both types of functional groups and mixtures of copolymers having different functional groups. The most preferred sulfonyl containing perfluorocarbon copolymer is a copolymer of tetrafluoroethylene and perfluoro (3,6-dioxa-4-methyl-7-octenesulfonyl fluoride), from which the sulfonic acid form or the salt form can be obtained. The most preferred carbonyl containing perfluorocarbon copolymer is a copolymer of tetrafluoroethylene and methyl perfluoro (4,7-dioxa-5-methyl-8-nonenoate), from which the carboxylic acid form or the salt form can be obtained.

Generally, sulfonyl, carbonyl, sulfonate and carboxylate esters and sulfonyl and carbonyl based amide forms of the perfluorocarbon copolymer are readily converted to ion exchange forms by a hydrolysis reaction. For example, the salt form can be obtained by treatment with a strong alkali such as NaOH and the acid form can then be generated by treatment with acid such as HCl. This conversion step can be carried out before or after the membrane substrate has been surface modified with the sulfonyl, carbonyl, sulfonate and carboxylate esters and sulfonyl and carbonyl based amide forms of the perfluorocarbon copolymer.

Perfluorocarbon copolymers used in the process of this invention need not be restricted to a particular equivalent weight, instead, any copolymer having any equivalent weight may be used, as long as it binds to the membrane substrate surfaces and it is not substantially removed by contact with a liquid composition which is a solvent or a diluent for unbound, solvated copolymer. Additionally, any perfluorocarbon copolymer having any equivalent weight may be used which prevents dewetting of the resulting surface modified membrane during use. Generally the equivalent weight of the perfluorocarbon copolymer is between about 900 and about 1500, more usually between about 1050 and about 1250. The equivalent weight of a perfluorocarbon copolymer is the average weight of one repeat unit of the copolymer.

The solvent utilized to form the perfluorocarbon copolymer solution from which the membrane substrate surface modification is derived includes the solvents disclosed by U.S. Pat. No. 4,386,987, which is incorporated herein by reference. These solvents include Halocarbon Oil, perfluorooctanoic oil, N-akylacetamides and decafluorobiphenyl. Alternatively, the halogenated saturated hydrocarbons disclosed by U.S. Pat. No. 4,348,310, which is incorporated herein by reference, can be utilized. The preferred solvents are the alcoholic solvents disclosed by U.S. Pat. Nos. 4,433,082 and 4,453,991 which are incorporated herein by reference. The alcoholic solvents include methanol, ethanol, n-propanol, isopropanol, n-butanol, 2-butanol, 2-methoxy ethanol, 2-ethoxy ethanol, ethylene glycol dimethyl ether, ethylene glycol diethyl ether, diethylene glycol dimethyl ether, diethylene glycol diethyl ether, dioxane and acetonitrile and mixtures thereof with or without water. The most preferred solvent is a mixture of water and a lower alcohol such as isopropanol. The solutions of the perfluorocarbon copolymers are formed at elevated temperature, typically 180° C. to 300° C., below the critical temperature of the solvent and elevated pressure in a closed vessel. These solutions are miscible with solvents or diluents for the perfluorocarbon copolymers, such as isopropanol, ethanol, water or the like, without precipitating the perfluorocarbon copolymer.

The concentration of the perfluorocarbon copolymer in the solution should be high enough to effect binding of the copolymer to the membrane substrate and to prevent dewetting of the resulting surface modified membrane, but low enough to prevent adverse reduction of the flux characteristics of the resulting surface modified membrane. Typically, the concentration of the perfluorocarbon copolymer in the solution is between about 0.01 weight percent and about 10 weight percent, more usually between about 0.1 weight percent and about 5 weight percent.

The porous membrane substrate is a thin polymeric microporous or ultrafiltration membrane formed of a polymeric composition which is not solvated or degraded by the solvent for the perfluorocarbon copolymer composition. Typical membrane pore sizes are within the range of 10 microns to 0.01 microns. The membrane substrate can have any convenient geometric configuration including a flat sheet, a corrugated sheet, a hollow fiber or the like. The membrane can be supported or unsupported, isotropic or anisotropic, skinned or unskinned or can be a composite membrane. The membrane substrate has a thickness between about 5 microns and about 250 microns, preferably between about 10 microns and about 200 microns. Since the membrane is thin, removal of excess perfluorocarbon copolymer composition is facilitated thereby. Representative suitable membrane substrates include polyolefins such as polyethylene, polypropylene and polymethylpentene, polysulfone, polyethersulfone, polyimide, polyamide, fluorine-containing polymers including polytetrafluoroethylene, fluorinated ethylene-propylene copolymer, ethylene-tetrafluoroethylene copolymer or a perfluoroalkoxy polymer. The preferred membrane substrates are formed from a fluorine-containing polymer, particularly polytetrafluoroethylene, fluorinated ethylene-propylene copolymer or a perfluoroalkoxy polymer such as the group of polymers generally known as fluorocarbons marketed by E. I. Dupont de Nemours and Company, Inc. under the names Teflon® PTFE, Teflon® FEP and Teflon® PFA.

The membrane has its entire surface completely modified with bound perfluorocarbon copolymer composition so that no exposed substrate surface is present. It is preferred that the completely modified surface also be substantially uniformly coated with the bound perfluorocarbon composition. Complete surface modification prevents membrane dewetting when filtering a liquid. Uniform surface modification promotes uniform filtration through the filter. In addition, the surface modifying composition is utilized in amounts and concentrations so that the porous membrane substrate is not substantially blocked or plugged as determined by measuring an increase in pressure drop across the membrane during filtration of purified water. The modified porous membrane product of this invention has substantially the same permeability as measured by pressure drop as the unmodified porous membrane substrate. That is, this pressure drop does not exceed an increase of greater than 25% as compared to the pressure drop across the unmodified porous membrane substrate with the modified porous membrane of this invention. Perferably, this pressure drop increase does not exceed 15% and, most preferably, does not exceed 10% as compared to the pressure drop across the unmodified porous membrane substrate.

In one embodiment of this invention, a surface modified membrane is formed having an average pore size of 0.2 micron or less. The membrane is formed from a fluorine-containing polymer membrane substrate, preferably a polytetrafluoroethylene, fluorinated ethylene-propylene copolymer or a perfluoroalkoxy polymer membrane substrate having its surfaces modified with a bound surface modifying composition set forth above. The membrane substrate has its surfaces completely modified by the bound surface modifying composition. The bound surface modifying composition prevents dewetting of the membrane during its use in filtering a liquid composition. During filtration, the "final" pressure drop across the modified membrane is no greater than about three times, preferably no greater than about two times, of the "initial" pressure drop across the surface modified membrane as measured according to the standard dewetting test.

The pressure drop of a filter is a measure of the resistance of the filter to liquid flow. A high pressure drop indicates a high resistance, such as when the filter is dewet or is plugged. A low pressure drop indicates a low resistance, such as when the filter is new and completely wet. In most cases, pressure drop data should be considered relative to the same filter under different conditions, to another filter of the same type or to the same filter prior to being surface modified, as different types of filters will have different pressure drops due to different membrane pore size, surface area and configuration in the filter. Pressure drops are measured in pounds per square inch (psi) of differential pressure across the filter normalized at a constant liquid flow rate of 1.0 gallon per minute (gpm). During testing, pressure drop is most preferably measured with purified water. The extent of pore plugging, if any, of the modified membrane is set forth above.

The Standard Dewetting Test is used as a means to predict the degree of dewetting or non-dewetting performance of a filter during an actual filtration application. The test uses water as the liquid being filtered. This test excludes other potential flow rate reducing effects such as due to viscosity differences in the liquid or due to increased resistance to flow caused by particulates removed from the liquid which can become trapped on the membrane surfaces. To conduct the test, a filter is wet with 100% isopropanol, drained without drying and placed in a flushing apparatus where it is flushed with water by passing water through the filter for 10 minutes at a flow rate of 1 gallon per minute or gpm. At the end of this flush period, the "initial" pressure drop of the filter is measured. The filter then is removed from the flushing apparatus, drained while avoiding drying of the filter and replaced in the flushing apparatus where the filter is flushed with water at 1 gpm while the "drain #1" pressure drop is measured. Care is taken to vent bulk air from the upstream side of the filter during the initiation of water flow through the filter. Three additional identical drain procedures are repeated followed by the corresponding "drain #2, drain #3 and drain #4" pressure drops. After the "drain #4" pressure drop, the filter is removed from the flushing apparatus, drained while avoiding drying of the filter and replaced in the flushing apparatus where the filter is pressurized with air on the upstream side to create a pressure differential of 5 psi across the filter. The filter then is flushed with water at 1 gpm and the "drain #5, 5 psi air" pressure drop is measured. Two additional identical drain procedures with the 5 psi air pressure step are repeated followed by the corresponding "drain #6, 5 psi air" and "drain #7, 5 psi air" pressure drops. The last pressure drop datum, corresponding to the "drain #7, 5 psi air" pressure drop is normally referred to as the "final" pressure drop.

The bound surface modifying composition also prevents dewetting of the membrane during exposure of the membrane to gases, such as air, as long as the membrane is not exposed for a period of time sufficiently long to cause drying of the membrane. During use in a filtration process, the filter can be exposed to air under small pressure differentials across the filter such as during a replacement of the liquid being filtered.

It has been found that a water bubble point pressure test can also be used to predict the degree of dewetting observed in a filter during exposure to air. The lower the water bubble point pressure of a membrane, the higher the potential for dewetting upon exposure to air. Conversely, the higher the water bubble point pressure, the less potential for dewetting. The water bubble point pressure of the membrane products of the present invention are at least about 50% greater, preferably at least about 100% greater, than the water bubble point pressure of the unmodified membrane substrate, as measured by the water bubble point pressure test method. The water bubble point pressure test method measures the pressure required to force air through the pores of a membrane, which pores were previously filled with water. The bubble point of the membrane is measured from the pressure required to displace water from a water-wet membrane. A fluid-wet membrane will allow air to pass through it when the applied air pressure exceeds the capillary attraction of the fluid to the pore. The relation between the size of a fluid-wet cylindrical pore and the air pressure required to empty it (P, the bubble pressure for that cylindrical pore) is:

$$D = 4\gamma \cos\theta / P$$

where D is the diameter of the pore, $\theta$ is the contact angle and $\gamma$ is the surface tension of the wetting liquid. When measured bubble pressure can be empirically correlated to the size of real membrane pores it provides readily obtained estimates of the sizes of real, noncylindrical pores. One empirical method used to correlate bubble pressure with the pore sizes of the membranes of this invention is to determine the smallest particles that are retained by the membranes. The membrane is challenged with sub-micron size latex beads and the fraction of beads retained by the membrane is measured. If substantially all (>90%) of the beads are retained by the membrane, the largest pores are smaller than the average diameters of the latex beads.

It has been found that a surface modified membrane made in accordance with this invention typically has significantly improved particle retention properties as compared to the membrane substrate having an unmodified surface as measured by a modified SEMATECH particle retention method described in Millipore Corporation Technical Document MA041, available from Millipore Corporation, Bedford, Mass., USA and which is incorporated herein by reference. Surprisingly, the particle retention properties of the surface modified membranes are substantially improved as compared to the unmodified membrane substrate without significantly decreasing the flux characteristics of the membrane as measured by pressure drop. The membrane is formed from a fluorine-containing polymer membrane substrate, preferably a polytetrafluoroethylene, fluorinated ethylene-propylene copolymer or perfluoroalkoxy polymer membrane substrate having its surface modified with a bound surface modifying composition set forth above.

The surface modified membrane is formed by contacting the entire surface of the porous membrane substrate with a solution of the perfluorocarbon copolymer composition described above under conditions wherein the substrate surfaces are wet with the solution. The liquid solution can inherently wet the membrane substrate surfaces or the membrane substrate surfaces can be prewet with a wetting agent such as methanol, ethanol, isopropanol, or acetone followed by contact with the solution or the solution can be intruded into the pores under pressure. Contact of the membrane substrate with the solution can be effected by immersion or by passing the solution through the membrane under a pressure differential or by intrusion. The perfluorocarbon copolymer composition becomes bound to the substrate surfaces to completely modify the contacted substrate surfaces.

The membrane substrate is removed from contact with the solution and, in an important process step in this invention, when the solution does not wet the membrane, the membrane is contacted with a liquid composition which is a solvent, diluent or dispersant for excess or unbound solvated perfluorocarbon copolymer composition such as isopropanol, ethanol, methanol, water or the like, including mixtures thereof which do not cause substantial precipitation of the perfluorocarbon copolymer composition. Usually this liquid composition is also completely miscible with the solvent, diluent or dispersant used to make the solution of the perfluorocarbon copolymer composition. Water can be utilized when it is miscible with the solvent, diluent or dispersant for the perfluorocarbon copolymer composition used in the substrate surface modification step, such as an alcohol. Preferably, the liquid composition comprises the solvent used to make the solution of the perfluorocarbon copolymer composition such as isopropanol, ethanol, water or mixtures thereof. In this step, the liquid composition removes, such as by dilution and/or solvation, excess and unbound perfluorocarbon copolymer composition. This removal of the unbound composition reduces pore blockage and removes potential extractables which could contaminate a fluid being filtered during use of the surface modified membrane. This subsequent step of contacting the surface modified membrane with a solvent, diluent or dispersant optionally can be effected when the solution containing the perfluorocarbon copolymer composition initially wets the membrane. This subsequent contacting step provides a means for controlling the amount of perfluorocarbon copolymer composition deposited on the membrane surface.

Alternatively, the membrane substrate containing the perfluorocarbon solution is subjected to a mechanical force to remove excess modifying composition from the substrate and to effect modification on the entire substrate surface. Subsequent to contact with the solution, the membrane can be treated directly or indirectly by interposing a flexible film between the modified membrane and a source of mechanical force or the membrane can be positioned between two nonporous polymeric films to form a sandwich. Mechanical force can be suitably applied with a single roller contacted to one surface of the membrane or sandwich, two rollers forming a nip through which the membrane or sandwich is passed, an air knife, a doctor knife, a scraper, an absorbent or the like. Surprisingly, the liquid composition does not remove bound perfluorocarbon copolymer composition so that the surface modification is not adversely affected by contact with the liquid composition. Optionally, the surface modified membrane is then contacted with water to remove the liquid composition when the liquid composition is not water.

The surface modified membrane is dried to remove the water or the liquid composition and heat treated to improve the strength of binding between the bound perfluorocarbon copolymer composition and the membrane substrate. This drying and heat treatment can be effected in a single step. Heat treating is effected at a temperature which does not degrade the membrane substrate or the surface modifying composition. Generally, heat treating is conducted at a temperature between about 50° C. and about 180° C., more usually between about 80° C. and about 140° C. for a period of time between about 5 minutes and about 72 hours, more usually between about 15 minutes and about 24 hours.

The article of manufacture on this invention is provided which incorporates the membrane described above. The article of manufacture comprises a surface modified membrane positioned with respect to and sealed to a housing structure thereby to form an exposed portion of the membrane and an unexposed portion of the membrane. The unexposed portion of the membrane is that portion which contacts the housing within the seal formed by the housing. The exposed portion of the membrane is that portion which is in contact with fluid being filtered through the membrane during use of the article of manufacture. The exposed portion of the membrane has its surfaces modified with bound perfluorocarbon copolymer composition as described above. The unexposed portion of the membrane can be free of the surface modifying composition or can have its surfaces modified with bound perfluorocarbon copolymer composition.

Figure 2:
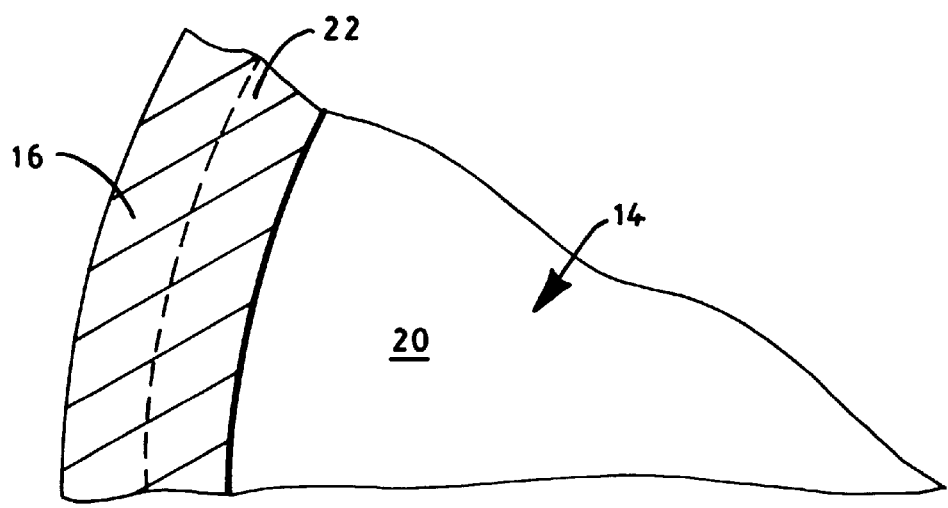
FIG. 2 is as top view of a portion of the article of manufacture of FIG. 1.
Figure 3:
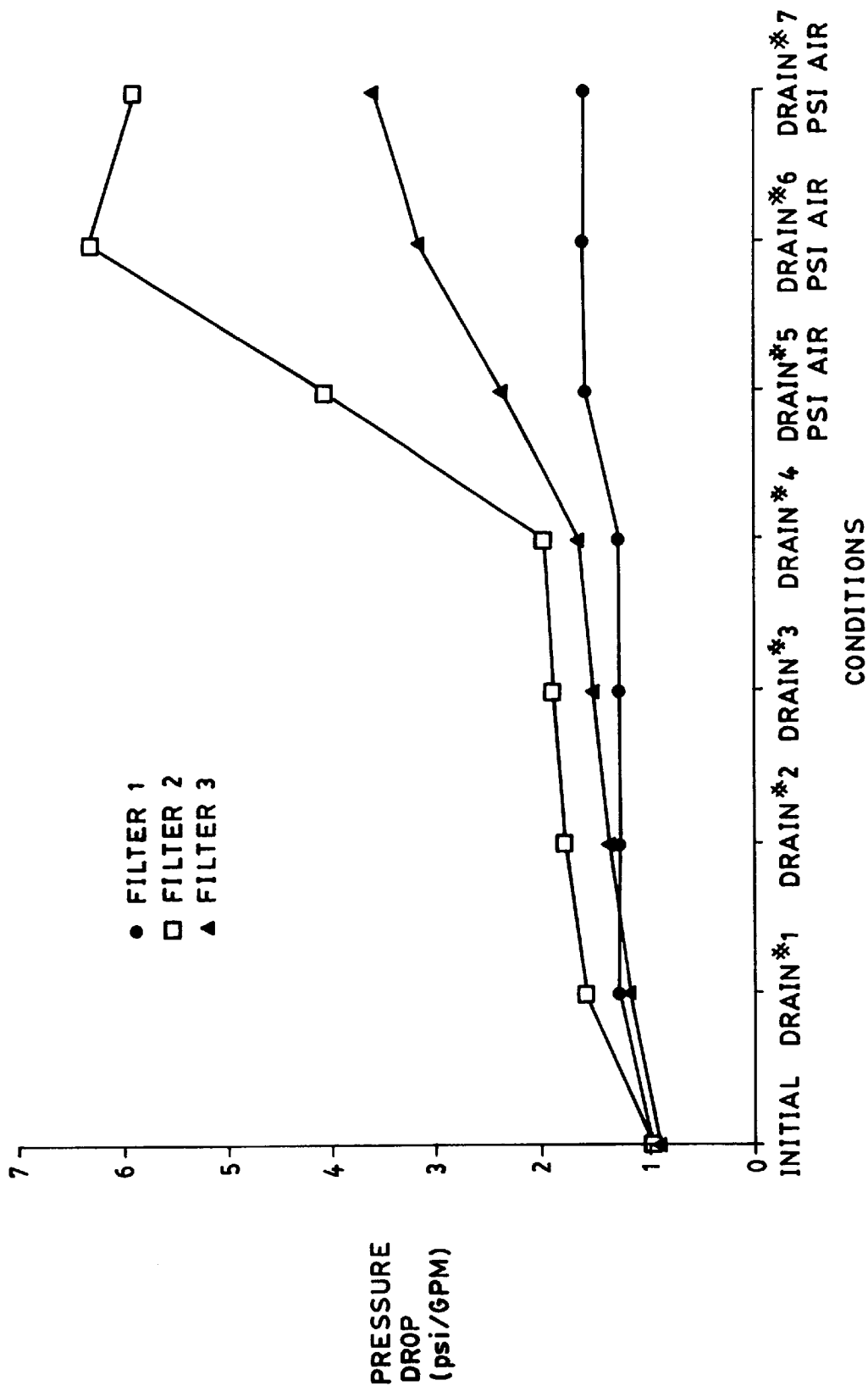
FIG. 3 is a plot of the results of the standard dewetting test of Example 10.
Figure 4:
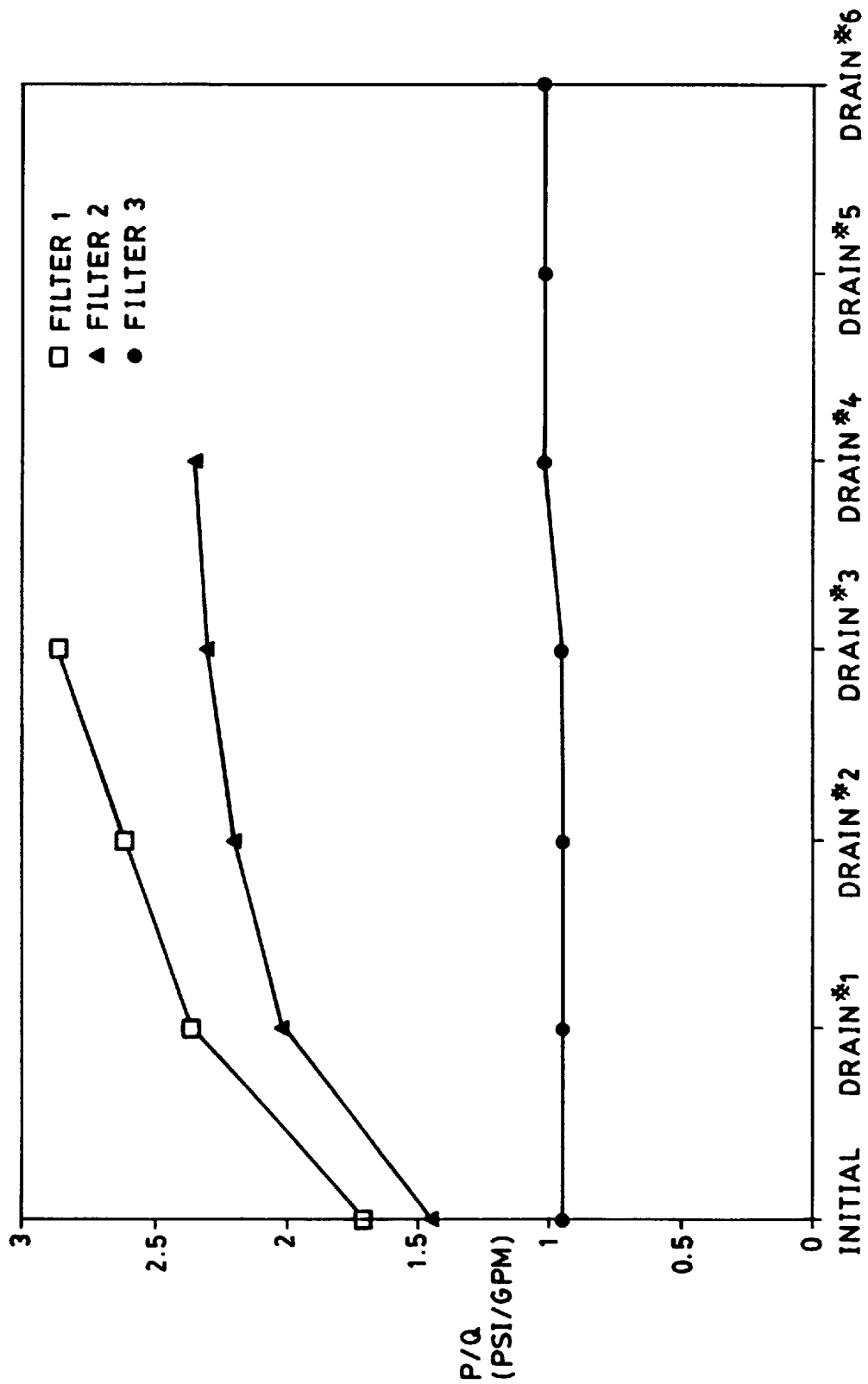
FIG. 4 is a plot of P/Q Vs. drain number of the Standard SC2 Drain Test of Example 11.

A representative article of manufacture of this invention is illustrated in FIGS. 1 and 2. Referring to FIGS. 1 and 2, the article of manufacture 10 includes a cylindrical housing 12, the surface modified membrane 14 described above and a porous support 13 for the membrane 14. The housing 12 is formed from two housing sections 16 and 18 which are sealed together with the membrane 14 and porous support 13 interposed therebetween and sealed thereto. The membrane 14 includes an exposed portion 20 which is surface modified as described above and an unexposed portion 22 comprising that portion of the membrane sealed to the housing 12. The unexposed portion 22 can have its surfaces unmodified or can have its surfaces modified as described above.

In use, fluid to be filtered is directed into housing 12 as indicated by arrow 24 to produce a filtrate as indicated by arrow 26 which has passed through the exposed portion 20 of membrane 14 and porous support 13. Any retentate formed is retained on the membrane 14, at or near the top surface of membrane 20 in contact with feed 24.

While the article of manufacture of this invention has been described above with reference to a cylindrical housing, it is to be understood that the housing can have any configuration so long as the membrane is sealed in a manner which permits fluid filtration without admixture of a filtrate with either a fluid feed to the article of manufacture or with a retentate formed during use of the article of manufacture in a filtration process. It is also to be understood that the membrane need not be configured as a flat sheet. Any membrane configuration is useful in the present invention so long as its integrity is maintained. Thus, the membrane can be a flat sheet, a curved sheet, a pleated sheet or a hollow fiber or the like.

The article of manufacture of this invention can be formed by first positioning the porous membrane substrate on a porous or vented support and then sealed, such as by heat sealing in a housing, thereby to form an exposed portion of the membrane and an unexposed portion of the membrane. The exposed portion of the membrane then is contacted with the solution of the perfluorocarbon copolymer composition set forth above. A differential pressure can then be applied across the membrane such as by gravity or with the aid of a vacuum or positive displacement device so that the geometric membrane surface contacting the solution is adjacent to the zone of high pressure while the opposing geometric membrane surface is adjacent to the zone of lower pressure. The differential pressure across the membrane causes the solution to be passed through the membrane and its support while the perfluorocarbon copolymer composition is deposited and becomes bound onto the membrane surfaces. Alternatively, the exposed portion of the membrane can be contacted with the solution of the perfluorocarbon copolymer composition without applying a pressure differential across the membrane such as by soaking the exposed portion of the membrane in a bath containing the solution for a time long enough to effect wetting of the membrane surfaces and deposition and binding of the perfluorocarbon copolymer composition onto the membrane surfaces.

Thereafter, excess unbound perfluorocarbon copolymer composition is removed from the membrane by contacting the surface modified membrane with a liquid composition such as isopropanol, ethanol, water or mixtures thereof, to effect removal, such as by dilution and/or salvation, of the excess unbound perfluorocarbon copolymer composition as set forth above. Optionally, the surface modified membrane is then contacted with water to remove the liquid composition. The resultant surface modified membrane then is dried to remove the water or the liquid composition and heat treated to strengthen the bond between the membrane substrate and the perfluorocarbon copolymer composition as set forth above.

In one embodiment of this invention, the membrane substrate can be surface modified in the manner set forth above prior to being sealed in a housing to form an article of manufacture. Sealing of the housing and membrane should be effected in a manner which minimizes exposure of the surface modified membrane to excess heat. This can be effected by minimizing the volume of housing which is melted prior to joining the housing sections to form the sealed housing. Alternatively, sealing of the housing and membrane can be effected by ultrasonic welding wherein the energy supplied to effect sealing can be accurately controlled.

The surface modified membrane of this invention is particularly useful for filtering outgassing liquids by preventing dewetting of the membrane during use due to the surface modifying composition which is bound to the membrane substrate. Thus, the membranes of this invention are particularly useful for filtering chemically active outgassing liquids such as acids or bases that can contain an oxidizer when utilizing a fluorocarbon polymer as a substrate, such as polytetrafluoroethylene, a fluorinated ethylene-propylene copolymer or a perfluoroalkoxy polymer. In these instances, both the membrane substrate and the surface modifying composition are highly resistant against chemical degradation while the resulting surface modified membrane is not dewet by gases.

In one embodiment of this invention, the surface modified membrane can be wet with water or the process fluid to be filtered either directly with or without pressure or indirectly wherein the membrane first is wet with an alcohol such as isopropanol. In the latter case, the alcohol is replaced by introducing water until the alcohol has been removed and replaced with water followed by the process fluid to be filtered. A water-containing filtration device comprising a water-wet surface modified membrane of the present invention then can be sealed within a container together with additional water, if desired, and heated such as by steam sterilization to inactivate any microorganisms therein. For example, the process disclosed in U.S. Pat. No. 4,727,705, which is incorporated herein by reference, can be used to form a water-wet filtration device which can be shipped to an end user who then can use the filtration device directly without the need for performing a membrane-wetting process.

The following examples illustrate the present invention and are not intended to limit the same.

EXAMPLE 1

A solution containing 0.5 weight percent Nafion® perfluorocarbon copolymer in a mixture of lower aliphatic alcohols and water was prepared by making a 10:1 dilution of a commercially available 5 weight percent Nafion® perfluorocarbon copolymer solution in a mixture of lower aliphatic alcohols and water obtained from Aldrich Chemical Company, Inc., Milwaukee, Wis., with isopropyl alcohol. The Nafion® perfluorocarbon copolymer in the solution was in the sulfonic acid form and had an average equivalent weight of 1,100.

A 10 inch pleated filter device comprising a polytetrafluoroethylene (PTFE) membrane having a pore size of 0.1 micron was slowly immersed in a container having the dilute solution of Nafion® perfluorocarbon copolymer from above, until the level of the solution on the upstream side, or outside of the filter completely covered the membrane while preventing the solution from entering the downstream side, or inside of the filter, by any other means except through the membrane. Time was allowed for the solution to permeate through the membrane so as to fill the core of the filter, on the downstream side, with the solution. When the core was filled with the solution, a pressure differential across the membrane was created by applying a vacuum of 1 inch of mercury on the downstream side of the filter so that the solution begins to flow through the membrane and out of the core of the filter. A total of 240 milliliters, in addition to the downstream volume of the filter, of solution were passed through the filter at a slow flow rate, dictated by the small difference in pressure across the membrane. The filter was then removed from the solution and drained of excess solution while being careful to avoid drying of the filter and placed in a second container having 100% isopropanol to remove excess perfluorocarbon copolymer from the membrane. A total of 2 liters, in addition to the downstream volume of the filter, of isopropanol were passed through the filter, under identical differential pressure conditions as described above. The isopropanol-wet filter was then removed from the isopropanol, drained without drying and placed in a flushing apparatus where it was flushed with water by passing water through the filter for 20 minutes at a flow rate of 1 gallon per minute to further remove any remaining unbound perfluorocarbon copolymer and/or isopropanol. The water-flushed filter was removed from the apparatus and immersed in 2 Molar hydrochloric acid for 16 hours to further clean the filter. The filter was removed from the hydrochloric acid, rinsed with water and further flushed with water for 30 minutes as described above. The drained, water-wet filter was then placed in an oven and exposed to heat at 120° C. for 16 hours to dry the filter and to improve the strength of binding between the bound perfluorocarbon copolymer and the membrane substrate.

The dry, modified filter was wet with 60% isopropanol/40% water and tested for integrity by a bubble point pressure test method. The bubble point pressure of the filter was measured to be 42 psi, indicating that the filter was integral. The filter was then wet with 100% isopropanol, drained and installed in the flushing apparatus where water was flushed through the filter for 5 minutes at a flow rate of 1 gallon per minute to displace the isopropanol. The pressure drop of the filter was measured to be 0.66 psi/gpm. The pressure drop of an unmodified wet PTFE filter of the same type was measured to be 0.65 psi/gpm, under the same conditions.

EXAMPLE 2

A continuous length of about 100 linear feet of a PTFE membrane having a pore size of 0.1 micron was surface modified with Nafion® perfluorocarbon copolymer by continuously passing the membrane into a bath having the solution containing 5 weight percent Nafion® perfluorocarbon copolymer of example 1, at a speed of 5 feet per minute for a total contact time of about 2 minutes. The membrane was then directed into a second bath containing water to remove excess solution from the membrane. The contact time of the membrane with water in this bath was about 5 minutes. The membrane was then directed into a third bath in which fresh water was sprayed constantly on the membrane to further clean the membrane. The contact time of the membrane with water in this bath was also about 5 minutes. The wet, modified membrane was then passed under hot air to dry the membrane. The dry membrane was then wound up onto itself to form a roll. The roll of modified membrane was placed in an oven at 100° C. for 16 hours to improve the strength of binding between the bound perfluorocarbon copolymer and the membrane substrate.

The surface modified membrane was used to make 4 inch pleated filter devices by heat sealing the membrane to a perfluoroalkoxy polymer housing. The devices were found to be integral as tested by the bubble point pressure method. The pressure drop of the filters was measured to be 1.5 psi/gpm. The pressure drop of a filter device of the same type, except comprising an unmodified wet PTFE membrane, was measured to be 1.5 psi/gpm, under the same conditions.

EXAMPLE 3

A 47 millimeter diameter disk of PTFE membrane having a pore size of 0.1 micron was immersed in the 5 weight percent Nafion® perfluorocarbon copolymer solution from example 1, for 2 minutes. The membrane disk was removed from the solution and drained of excess solution while being careful not to dry it. The wet membrane was then immersed in 10 milliliters of 100% isopropanol for 5 minutes to remove excess perfluorocarbon copolymer, followed by three water rinses to displace the isopropanol. The water-wet membrane was placed in an oven and dried at 120° C. for 2 hours. The surface modified membrane was found to have a 3.7% weight increase, based on the weight of the initial membrane substrate, due to the deposited, bound perfluorocarbon copolymer.

The 10 milliliters of 100% isopropanol used to remove excess copolymer from the modified membrane were concentrated to 1 milliliter by evaporation and analyzed by Fourier Transform Infrared Spectroscopy (FTIR). The FTIR spectrum of the concentrate showed the presence of perfluorocarbon copolymer, demonstrating the removal of unbound perfluorocarbon copolymer from the membrane by solvation and/or dilution. The FTIR spectrum of an isopropanol blank showed no evidence of perfluorocarbon copolymer.

EXAMPLE 4

The dry, surface modified membrane from example 3 was immersed in 10 milliliters of 100% isopropanol for 5 minutes, followed by three water rinses to displace the isopropanol and dried at 120° C. in an oven for 2 hours. The weight of the modified membrane disk was found to be identical to the weight of the membrane before exposure to isopropanol in this example (the weight of the modified membrane of example 3). This example demonstrates that all of the deposited, bound perfluorocarbon copolymer remains on the membrane surfaces even after contact of the modified membrane with a solvent or diluent for solvated unbound perfluorocarbon copolymer when the membrane is heat treated during or after the drying step in example 3.

(Comparative) EXAMPLE 5

A 47 millimeter diameter disk of PTFE membrane having a pore size of 0.1 micron was surface modified with Nafion® perfluorocarbon copolymer according to the method of example 3, except that the membrane was not exposed to heat during the drying step. Instead, the membrane was allowed to dry at room temperature for 2 hours. The surface modified membrane was found to have a 4.1% weight increase, based on the weight of the initial membrane substrate, due to the deposited, bound perfluorocarbon copolymer.

The dry, surface modified membrane was then immersed in 10 milliliters of 100% isopropanol for 5 minutes, followed by three water rinses to displace the isopropanol and allowed to dry at room temperature for 2 hours. The membrane disk was found to have lost weight in an amount corresponding to 7.4% based on the weight of the deposited, bound perfluorocarbon copolymer present before exposure of the dry modified membrane to isopropanol. This example demonstrates that although most of the deposited, bound perfluorocarbon copolymer remains on the membrane surfaces after contact of the modified membrane with a solvent or diluent for unbound solvated perfluorocarbon copolymer, a small fraction can be removed when the membrane is not heat treated during or after the drying step.

EXAMPLE 6

A 10 inch pleated filter device comprising a PTFE membrane having a pore size of 0.1 micron was modified with Nafion® perfluorocarbon copolymer according to the procedure of example 1. A similar filter comprising a 0.05 micron membrane was also surface modified in the same manner. After wetting both filters with water, the two water-wet filters were sealed within a bag containing water and were sterilized under autoclaving conditions. The bags containing the wet filters were allowed to cool for 24 hours before the filters were removed from the bags to measure the pressure drops. The 0.1 micron filter had a pressure drop of 0.8 psi/gpm and the 0.05 micron filter had a pressure drop of 1.0 psi/gpm.

The two filters were then wet with 100% isopropanol and flushed with water to measure the pressure drops after the rewetting procedure. The 0.1 micron filter had a pressure drop of 0.8 psi/gpm and the 0.05 micron filter had a pressure drop of 1.0 psi/gpm. This example illustrates the non-dewetting properties of the products of the present invention under highly outgassing liquid conditions.

(Comparative) EXAMPLE 7

A water-wet Super-Cheminert™ filter device comprising a 0.1 micron pore size PTFE membrane, sealed within a bag containing water was obtained from Pall Corporation, East Hills, N.Y. Similarly, a water-wet Ulti-Cheminert™ filter device comprising a 0.05 micron pore size PTFE membrane was also obtained from Pall Corporation, East Hills, N.Y. The pressure drops of the two filters "as received" were measured immediately after removing the filters from the corresponding bags. The 0.1 micron device had a pressure drop of 1.4 psi/gpm and the 0.05 micron device had a pressure drop of 6.3 psi/gpm.

The two filters were then wet with 100% isopropanol and flushed with water to measure the pressure drops after the rewetting procedure. The 0.1 micron device had a pressure drop of 0.7 psi/gpm and the 0.05 micron device had a pressure drop of 0.9 psi/gpm. This example illustrates the dewetting phenomenon observed in products of the prior art in the presence of outgassing liquids such as water.

EXAMPLE 8

A 47 millimeter diameter disk of an ultrahigh molecular weight polyethylene membrane having a pore size of 0.1 micron was immersed in the 5 weight percent Nafion® perfluorocarbon copolymer solution from example 1, for 2 minutes. The membrane disk was removed from the solution and drained of excess solution while being careful not to dry it. The wet membrane was then immersed in 10 milliliters of 100% isopropanol for 5 minutes to remove excess perfluorocarbon copolymer, followed by three water rinses to displace the isopropanol. The water-wet membrane was placed in an oven and dried at 90° C. for 2 hours. The surface modified membrane was found to have a 2.8% weight increase, based on the weight of the initial membrane substrate, due to the deposited, bound perfluorocarbon copolymer. The presence of perfluorocarbon copolymer on the surface of the modified membrane was confirmed by an FTIR analysis.

EXAMPLE 9

A 10 inch stacked disk filter device comprising a PTFE membrane having a pore size of 0.1 micron was modified with Nafion® perfluorocarbon copolymer as described in example 1. The modified filter was tested according to the modified SEMATECH particle retention method referred to above and was found to have a Log Reduction Value (LRV) of 4.5 (99.995% retention) with 0.05 micron particles. The pressure drop of the filter was measured to be 0.77 psi/gpm.

An unmodified control filter of the same type was also tested according to the modified SEMATECH particle retention method and was found to have a Log Reduction Value (LRV) of 1.0 (90.0% retention) with 0.05 micron particles. The pressure drop of the filter was measured to be 0.74 psi/gpm. This example illustrates the improved particle retention characteristics of the products of the present invention.

EXAMPLE 10

The following filters were tested according to the standard dewetting test set forth above: (1) a 10 inch pleated filter device comprising a PTFE membrane having a pore size of 0.05 micron and having its surfaces modified with Nafion® perfluorocarbon copolymer according to example 1, (2) an unmodified wet control filter of the same PTFE type and (3) an Ultra-Cheminert™ filter device comprising a 0.05 micron pore size PTFE membrane obtained from Pall Corporation, East Hills, N.Y.

Figure 5:
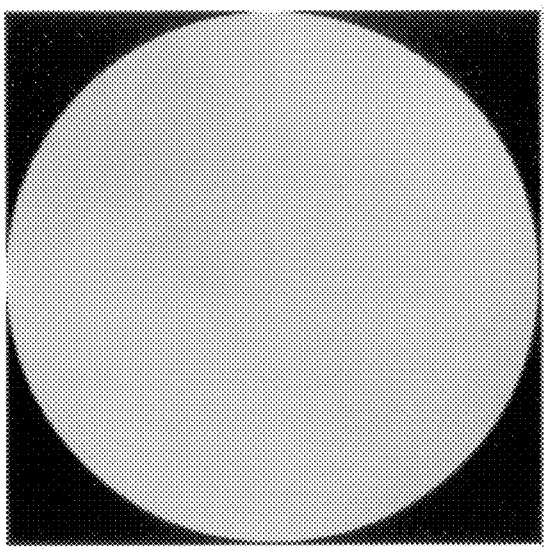
FIG. 5 is a photograph (4.3×) of the undyed control of Example 14.

The results of the test are presented in FIG. 5 which represents a plot of pressure drop Vs. condition or drain number. The modified filter (1) showed a 64% increase in pressure drop during filtration from an initial pressure drop while filters (2) and (3) showed a 600% and a 300% increase during filtration from an initial pressure drop, respectively. All the filters were then rewet with 100% isopropanol and the water pressure drops were once again measured. After the rewetting procedure, all the pressure drops were substantially the same as the initial pressure drops, indicating that the increase in pressure drop or loss of flux characteristics observed during the test were due solely to dewetting during the filtration process.

EXAMPLE 11

A 10 inch pleated, disk filter device comprising a PTFE membrane having a pore size of 0.05 micron was modified with Nafion® perfluorocarbon copolymer as described in example 1. The filter was then tested according to the "Standard $SC_2$ Drain Test" method as follows. The filter was wet with 100% isopropanol and flushed with water to replace the alcohol. The filter was then installed in the filter holder of a filtration system of a recirculating chemical bath system used to purify a bath of liquid utilized to clean silicon wafers during the fabrication of integrated circuits. This liquid, known as SC2, is a highly outgassing and chemically active liquid comprising 0.2 parts of 37% hydrochloric acid (HCl), 1 part of 30% hydrogen peroxide ($H_2O_2$), as a strong oxidizer, and 5 parts water. The temperature of the liquid in the bath is maintained at 80° C.

During the filtration process, a positive displacement pump is used to push the liquid through the filter device thus creating a pressure drop across the filter. Since direct pressure drop data of a filter in use are difficult to obtain, the pressure on the upstream side of the filter (P) is monitored as well as the liquid flow rate through the filter (Q). It is common in the industry to use the ratio of the above pressure divided by the flow rate (P/Q) as an indication of the total system resistance to flow. Since the only part of the filtration system that can potentially change with time is the filter resistance to flow due to particulate removal or due to dewetting, the P/Q ratio is a direct measure of the filter's resistance to liquid flow. The P/Q ratio is a more sensitive measure of a filter's resistance to flow since it changes more dramatically than changes in P alone or Q alone. P is measured in pounds per square inch (psi) and Q is measured in gallons per minute (gpm). P/Q is therefore given in psi/gpm. Millipore Corporation Technical Document MA059, available from Millipore Corporation, Bedford, Mass., USA which is incorporated herein by reference, explains this process in more detail.

With the wet filter installed in the holder of the filtration system, the SC2 liquid at 80° C. was passed through the filter and the "initial" P and Q were measured. In this example, only clean SC2 liquid was used and no wafers were processed to avoid other potential effects which may result in increased resistance to liquid flow, such as retention of particles, thus isolating the dewetting phenomenon. The filter holder was drained of the liquid through a drain valve and a vent valve, the entire volume of liquid in the bath was also drained from the bath and from the piping, including the pump, using the pump to push air through the system, including through the filter holder. After this first drain cycle, the bath was filled with fresh SC2 liquid and heated to 80° C. while flowing liquid through the filter. The "drain #1" P and Q values were measured after the temperature of the liquid was established at 80° C. This drain cycle was repeated 5 additional times and the corresponding P and Q values were measured after each drain cycle. This example was repeated using an unmodified wet control filter, comprising a 0.05 micron PTFE membrane, filter 2, and an Ulti-Cheminer™ filter comprising a 0.05 micron pore-size PTFE membrane obtained from Pall Corporation, East Hills, N.Y., filter 3, for comparison.

The results from this example are presented in FIG. 5 which represents a plot of the P/Q ratio Vs. drain number. The results show that the modified membrane filter prepared according to the present invention (filter 1) does not dewet even under these highly chemically aggressive and highly outgassing conditions as seen by the constant P/Q ratio over time or drain number, while the unmodified filter (filter 2) and the Ulti-Cheminert™ (filter 3) dewet as seen by the increasing P/Q ratio.

EXAMPLE 12

A 10 inch stacked disk filter device comprising a PTFE membrane having a pore size of 0.1 micron was modified with Nafion® perfluorocarbon copolymer as described in example 1. The filter was wet with 100% isopropanol and flushed with water to replace the alcohol. A similar filter comprising a modified PTFE membrane having a pore size of 0.05 micron was wet in the same manner. The two water-wet filters were installed in a bubble point pressure test apparatus and the water bubble point pressure of the filters were measured. The water bubble point pressures of unmodified wet control filters were also measured in the same fashion.

The water bubble point pressures of the two modified filters were greater than 40 psi, whereas the bubble point pressures of the unmodified filters were less than 5 psi.

EXAMPLE 13

Several samples of 0.1 micron pore size PTFE membranes modified with Nafion® perfluorocarbon copolymer according to the methods of examples 1 and 3 were wet with 100% isopropanol and rinsed with water to replace the alcohol. The water-wet samples were immersed in the following chemicals under the following conditions:

(a) 97% sulfuric acid at 150° C. for 100 hours.

(b) 30% hydrogen peroxide at 50° C. for 100 hours.

(c) 2.4% tetramethylammonium hydroxide at 50° C. for 100 hours.

(d) A SC1 solution containing 1 part ammonium hydroxide (28%) to 1 part hydrogen peroxide (30%) to 5 parts water, at 80° C. for 3 hours.

(e) A SC2 solution containing 1 part hydrochloric acid (37%) to 1 part hydrogen peroxide (30%) to 5 parts water, at 80° C. for 3 hours.

(f) A piranha solution containing 7 parts sulfuric acid (97%) and 1 part $H_2O_2$ (30%) at 135° C. for 168 hours.

The SC1 and SC2 solutions were replaced every 30 minutes with fresh solution at temperature to maintain an effective level of oxidizer and the piranha solution was replaced every 24 hours with fresh solution. The samples from (c) and (d) were further treated with hydrochloric acid after the test to ensure that all samples were in the acid form after the test.

After exposure to these highly aggressive chemicals, the samples were thoroughly rinsed with water and were subsequently analyzed by FTIR along with control samples which were not exposed to the chemicals. The FTIR spectra of all the samples, including the controls, were identical indicating that no changes in chemical composition of the modified membranes had occurred. Additionally, quantitative analysis of the FTIR spectra determined that no changes in the amount of the modifying perfluorocarbon composition had occurred.

Comparative) EXAMPLE 14

This example illustrates a process of the prior art, described in U.S. Pat. No. 4,470,859 and the undesirable results obtained thereby. The extent of surface modification of a porous membrane substrate with a perfluorocarbon copolymer composition was determined by dye staining with the procedure set forth below.

A solution of Nafion® 117 perfluorocarbon copolymer was made by first cutting an 8 inch by 10 inch film of Nafion® 117 into 2 inch by 2 inch film pieces. Nafion® 117 is the sulfonic acid form of Nafion® copolymer film having an ion exchange capacity of 0.91 meq/g and an equivalent weight of 1100.

The smaller film pieces were then converted to the lithium sulfonate form of the copolymer by immersing them in an aqueous solution of 3 wt % LiOH, and 1 wt % dimethyl sulfoxide (DMSO) based upon the weight of the solution. The solution was heated to 50° C. for four hours and then cooled to room temperature. The film pieces were removed from the solution and rinsed in deionized water for one hour three times. The film pieces were determined to comprise the perfluorocarbon copolymer in the lithium sulfonate form.

Fifteen grams of the lithium modified film pieces were placed in a round bottom flask with 285 ml tetramethylene sulfone (Sulfolane) solvent and heated to 240° for 4 hours while stirring under a nitrogen blanket. Thereafter, the solution was cooled to 25–30° C. to form a 5% by weight solution of the copolymer which was diluted to form a 1% by weight solution by adding Sulfolane.

Following the procedure of U.S. Pat. No. 4,470,859, a 2 micron PTFE membrane was then immersed in the 1% solution which did not wet the membrane. A container for the solution and membrane was placed in a vacuum chamber and subjected to a vacuum of 150 mm Hg absolute for 2 minutes followed by quick venting to the atmosphere. The vacuum and quick venting was repeated. The solution still did not wet the membrane.

The membrane then was removed from the solution and placed in an oven at 130° C. for 6 hours. The membrane was removed from the oven, cooled at room temperature and immersed in isopropanol (IPA) to wet the membrane. The wet membrane then was immersed in a 0.1% aqueous solution of Methylene Blue dye until staining of the membrane surface was effected. The membrane then was washed sequentially in water, IPA and water while being agitated to remove excess dye from the membrane.

Figure 9:
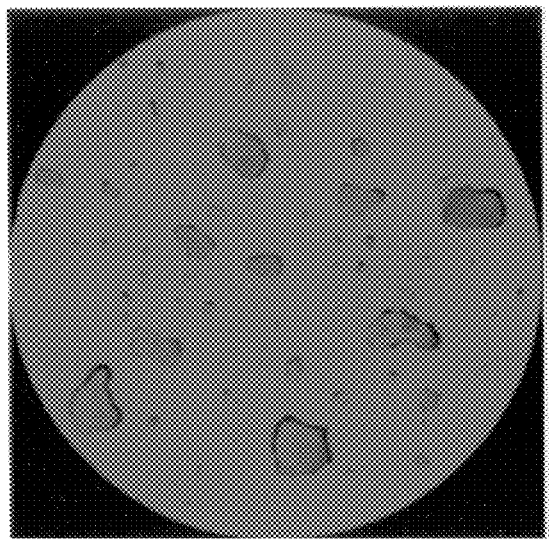
FIG. 9 is a photograph (4.3×) of the nonprewet coated sample of Example 14, stained.
Figure 6:
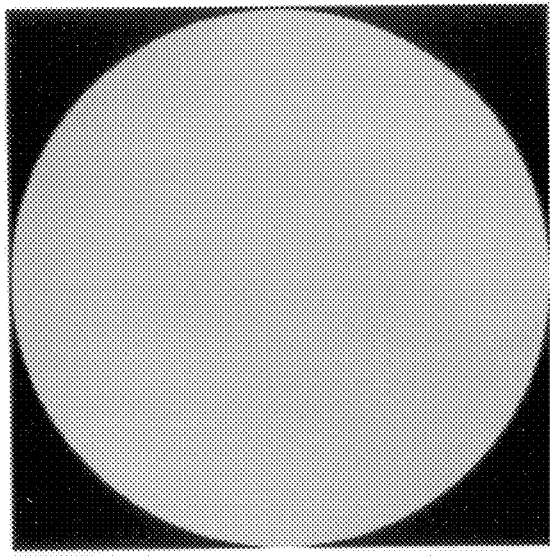
FIG. 6 is a photograph (4.3×) of the dyed control of Example 14.

The photograph of FIG. 9 shows that the surface modifying composition incompletely modified the membrane surface as shown by the dark spots. The light background comprises the unmodified membrane substrate. The controls of FIG. 5 (undyed PTFE membrane) and FIG. 6 (PTFE immersed in 0.1% aqueous Methylene Blue followed by rinsing) shows that the PTFE membrane substrate is not dyed with Methylene Blue.

The process for surface modifying a 0.2 micron PTFE porous membrane of U.S. Pat. No. 4,470,859 was repeated except that the PTFE membrane substrate was prewet with IPA for about 10 seconds prior to contact with the Sulfolane solution of the surface modifying copolymer described above in this example. IPA instantly wets the PTFE substrate. In addition, contact was not effected by vacuum and venting since the membrane was prewet. The purpose of the prewetting step was to determine whether it improved the surface modifying result shown in FIG. 9.

After being prewet with IPA, the membrane was immersed in Sulfolane for 5 minutes to replace IPA in the membrane with Sulfolane. The membrane wet with Sulfolane then was immersed in the 1% Sulfolane solution of the perfluorocarbon copolymer composition for 5 minutes. The membrane then was removed from the solution and immersed in a fresh 1% Sulfolane solution of the perfluorocarbon copolymer composition for 15 minutes.

Figure 10:
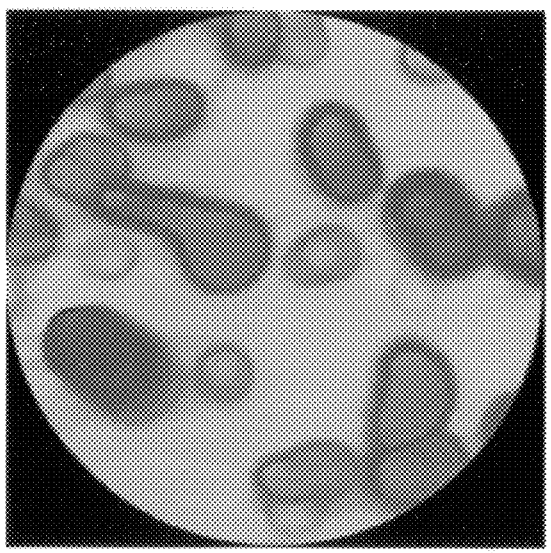
FIG. 10 is a photograph (4.3×) of the prewet coated sample of Example 14, stained.

The membrane then was removed from the solution and oven dried at 130° C. for 6 hours. The surface modified membrane then was stained with Methylene Blue as described above in this example. The surface modified membrane is shown in the FIG. 10 photograph. As shown in FIG. 10, the PTFE membrane is incompletely surface modified.

Comparative) EXAMPLE 15

This example illustrates that the process of the prior art described in U.S. Pat. No. 4,470,859 and utilizing a copolymer precipitation technique for surface modifying a membrane produces unsatisfactory results.

A 0.2 micron PTFE membrane substrate was immersed in the 1% Sulfolane solution of Example 14 and subjected to a vacuum and quick venting in two cycles as described in Example 14, the solution did not wet the membrane. The membrane was removed from the solution and immersed in toluene for 15 seconds to effect precipitation of the perfluorocarbon copolymer composition. The membrane then was removed from the toluene and placed in an oven at 130° C. for 6 hours. The membrane was removed from the oven, cooled and stained with Methylene Blue by the procedure described in Example 14.

Figure 7:
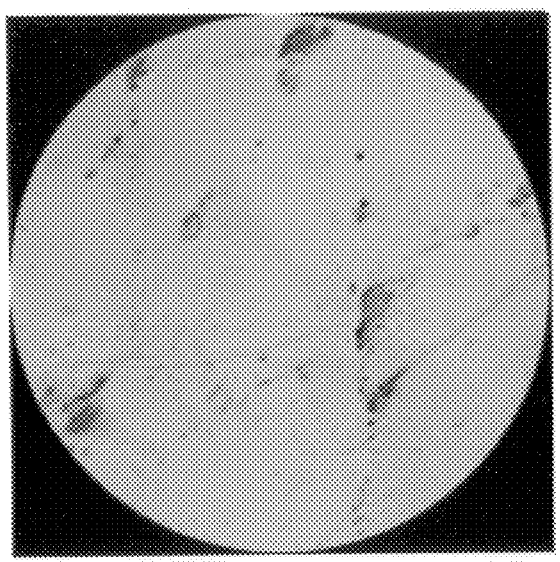
FIG. 7 is a photograph (4.3×) of the nonprewet precipitate coated sample of Example 15, stained.

The resultant membrane obtained and shown in FIG. 7 has its surface incompletely modified.

The process for surface modifying a 0.2 micron PTFE porous membrane of U.S. Pat. No. 4,470,859 was repeated except that the PTFE membrane substrate was prewet with IPA by immersion of the membrane in IPA to contact with the Sulfolane solution of the surface modifying copolymer described above in this example. In addition, contact was not expected by vacuum and venting since the membrane was prewet. The purpose of the prewetting step was to determine whether it improved the surface modifying results shown in FIG. 7.

Figure 8:
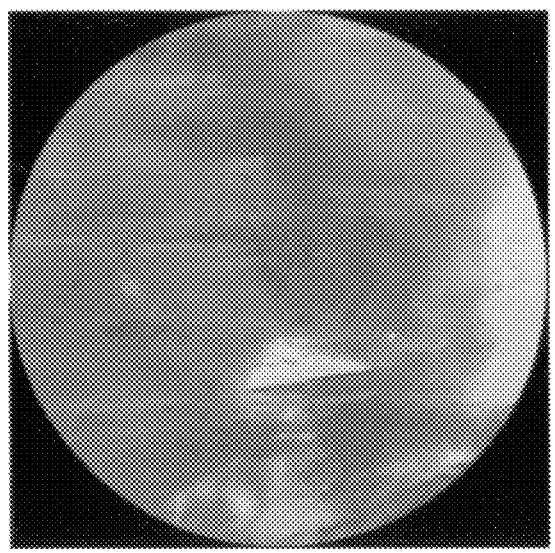
FIG. 8 is a photograph (4.3×) of the prewet precipitate coated sample of Example 15, stained.

After being prewet with IPA, the membrane was immersed in Sulfolane for 5 minutes to replace IPA in the membrane with Sulfolane. The membrane wet with Sulfolane then was immersed in the 1% Sulfolane solution on the perfluorocarbon copolymer composition of Example 14 for 5 minutes. The membrane then was removed from the solution and immersed in a fresh 1% Sulfolane solution of the perfluorocarbon copolymer composition of Example 14 for 15 minutes. The membrane was removed from the solution and immersed in toluene for 15 seconds to effect precipitation of the perfluorocarbon copolymer composition. The membrane was removed from the toluene and place in an oven at 130° C. for 6 hours. The surface modified membrane then was cooled and stained with Methylene Blue as described in Example 14. The surface modified membrane is shown in FIG. 8. While the membrane has more of its surface modified with the copolymer as compared to the membrane shown in FIG. 8, its surface is undesirably incompletely modified.

EXAMPLE 16

This example illustrates the process of this invention when utilizing a perfluorocarbon copolymer solution formed of a solvent which wets the membrane.

A 0.05 micron PTFE membrane was immersed for 1 minute at room temperature in a 1 wt. % solution of Nafion® perfluorocarbon copolymer in the sulfonic acid form in a mixture of lower alcohols and water obtained from Aldrich Chemical Company, Milwaukee, Wis. The perfluorocarbon copolymer had an equivalent weight of 1100. The membrane wets instantly in the solution.

The membrane was removed from the solution and immediately immersed in IPA for one minute at room temperature. The IPA wet the membrane. The membrane then was removed from the IPA and immediately immersed in water for 2 minutes while being agitated. The membrane was removed from the water and was oven dried at 120° C. for 2 hours.

The membrane was removed from the oven, cooled to room temperature and immersed in IPA. The membrane was removed from the IPA and immediately immersed in an aqueous 0.1% solution of Methylene Blue while being agitated.

Figure 13:
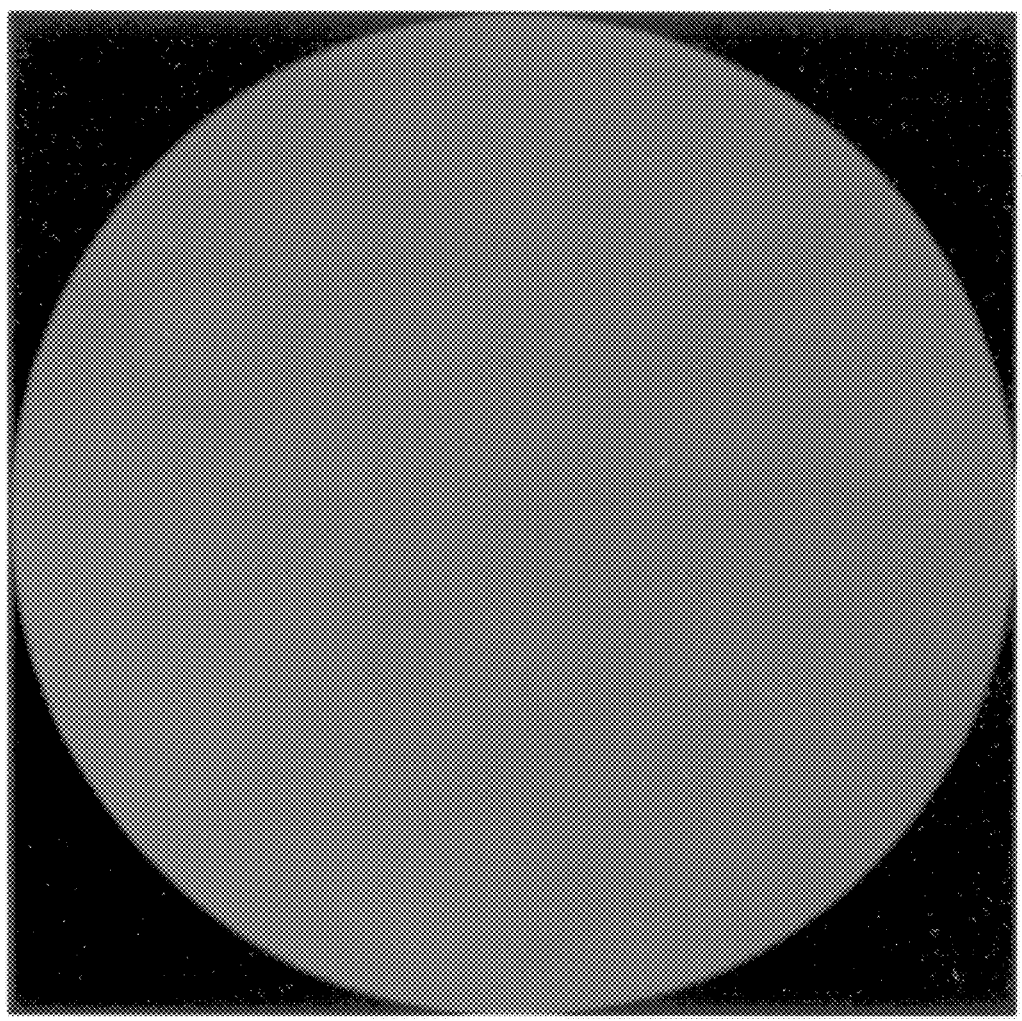
FIG. 13 is a photograph (4.3×) of a surface modified sample of this invention described in Example 16, stained.

The membrane was then washed to remove excess Methylene Blue in water, followed by IPA, followed by water immersion. The membrane then was dried at room temperature. The resultant membrane is shown in FIG. 13 which has it surface completely modified with the surface modifying composition.

EXAMPLE 17

This example illustrates that the membrane of this invention can be produced with a perfluorocarbon copolymer solution which does not wet the membrane when contact with the solution is followed by contact with a solvent which removes unbound perfluorocarbon copolymer and which wets the membrane.

A 0.05 micron PTFE membrane was prewet with IPA by the prewetting procedure described in Example 15. The membrane then was removed from the IPA and immersed in Sulfolane for 5 minutes to replace IPA in the membrane with Sulfolane. The membrane, wet with Sulfolane, then was immersed in a 1% solution of the perfluorocarbon copolymer solution described in Example 14 for 5 minutes. The membrane then was removed from the solution and immersed in a fresh 1% Sulfolane solution of the perfluorocarbon copolymer composition of Example 14 for 15 minutes.

The membrane then was removed from the solution and was immediately immersed in IPA for 2 minutes to remove excess surface modifying composition from the membrane. The membrane was removed from the IPA and immediately immersed in water for 2 minutes. The membrane was removed from the water and was oven dried at 120° C. for 16 hours.

Figure 11:
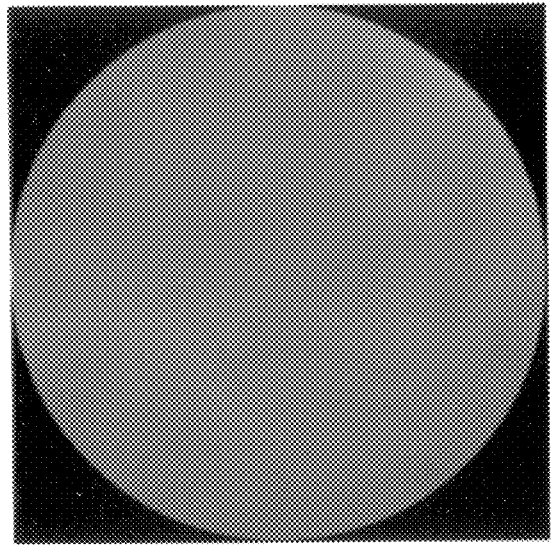
FIG. 11 is a photograph (4.3×) of a surface modified sample utilized in the present invention described in Example 17, stained.

The membrane then was stained with Methylene Blue by the procedure described in Example 14. The resultant membrane is shown in FIG. 11. The membrane surface is completely modified with the perfluorocarbon copolymer composition as shown by complete surface staining.

EXAMPLE 18

This example illustrates that a solution of a perfluorocarbon copolymer composition which wets a thin porous membrane substrate can be utilized to completely modify the membrane surface with the copolymer composition.

A 0.1 micron PTFE membrane was immersed in the alcohol solution of perfluorocarbon copolymer composition described in Example 16 for 15 seconds. The solution was observed to completely wet the membrane.

The membrane was removed from the solution and placed directly into an oven at 120° C. for 2 hours. The membrane was removed from the oven and was stained with Methylene Blue by the procedure of Example 14.

Figure 12:
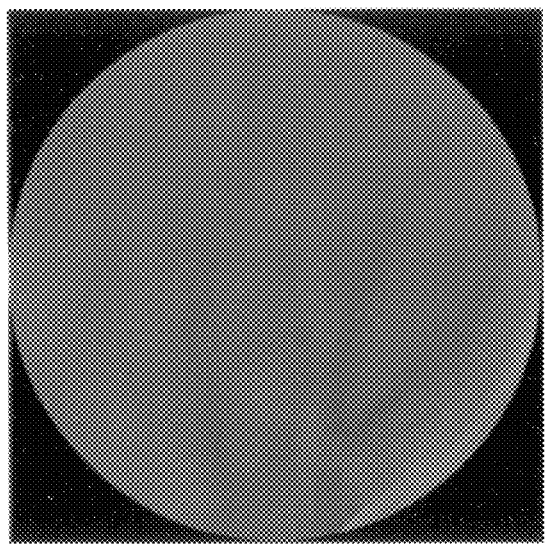
FIG. 12 is a photograph (4.3×) of a surface modified membrane utilized in the present invention described in Example 18, stained.

The membrane surface was completely modified with the copolymer as shown in FIG. 12.

EXAMPLE 19

This example illustrates the process of this invention when utilizing a perfluorocarbon copolymer solution formed of a solvent which wets the membrane.

A 0.05 micron PTFE membrane was immersed for 1 minute at room temperature in a 1 wt. % solution of Nafion® perfluorocarbon copolymer in the sulfonic acid form in a mixture of lower alcohols and water obtained from Aldrich Chemical Company, Milwaukee, Wis. The perfluorocarbon copolymer had an equivalent weight of 1100. The membrane wets instantly in the solution.

The membrane was removed from the solution and placed between two thin nonporous polyethylene sheets to form a sandwich positioned on a flat surface. A pressurized roller was rolled across the exposed surface of the sandwich to effect removal of excess solution from the sandwich. The membrane was removed from the sandwich and was oven dried at 120° C. for 2 hours.

The membrane was removed from the oven, cooled to room temperature and immersed in IPA. The membrane was removed from the IPA and immediately immersed in an aqueous 0.1% solution of Methylene Blue while being agitated.

Figure 14:
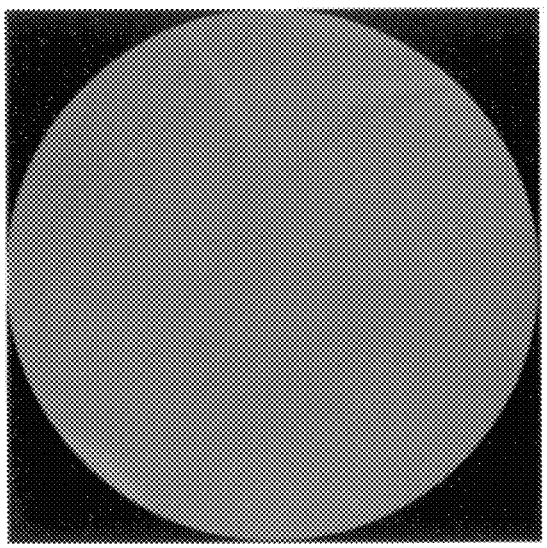
FIG. 14 is a photograph (4.3×) of a surface modified membrane utilized in the present invention described in Example 19, stained.

The membrane was then washed to remove excess Methylene Blue in water, followed by IPA, followed by water immersion. The membrane then was dried at room temperature. The resultant membrane is shown in FIG. 14 which has it surface completely modified with the surface modifying composition.

EXAMPLE 20

This example illustrates that the membrane of this invention can be produced with a perfluorocarbon copolymer solution which does not wet the membrane when contact with the solution is followed by subjecting the membrane to a mechanical force which renders the concentration of modifying composition more uniform on the membrane surface.

A 0.05 micron PTFE membrane was prewet with IPA by the prewetting procedure described in Example 15. The membrane then was removed from the IPA and immersed in Sulfolane for 5 minutes to replace IPA in the membrane with Sulfolane. The membrane, wet with Sulfolane, then was immersed in a 1% solution of the perfluorocarbon copolymer solution described in Example 14 for 5 minutes. The membrane then was removed from the solution and immersed in a fresh 1% Sulfolane solution of the perfluorocarbon copolymer composition of Example 14 for 15 minutes.

The membrane then was removed from the solution and was placed between two thin nonporous polyethylene sheets to form a sandwich positioned on a flat surface. A pressurized roller was rolled across the exposed surface of the sandwich to effect removal of excess solution from the sandwich. The membrane was removed from the sandwich and oven dried at 120° C. for 2 hours. The membrane was removed from the oven, cooled to room temperature and immersed in IPA to wet the membrane.

Figure 15:
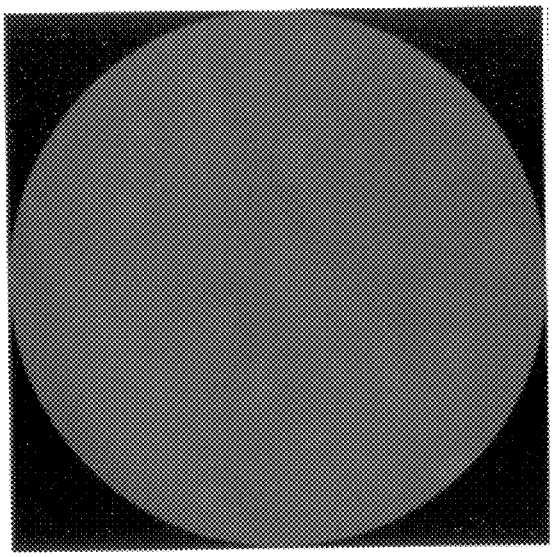
FIG. 15 is a photograph (4.3×) of a surface modified membrane utilized in the present invention described in Example 20, stained.

The membrane then was stained with Methylene Blue by the procedure described in Example 14. The resultant membrane is shown in FIG. 15. The membrane surface is completely modified with the surface modifying composition.

I claim:

1. An article of manufacture for filtering a fluid which comprises:
    a porous membrane comprising a porous polymeric substrate having an exposed portion and an unexposed portion;
    a housing for a fluid sealed to said unexposed portion,
    said exposed portion having deposited thereon a bound perfluorocarbon copolymer composition having hydrophilic groups to completely modify the entire surface of the exposed portion of the porous polymeric substrate thereby to render the entire exposed portion nondewetting;
    said exposed portion having substantially the same permeability as said porous polymeric substrate;
    said bound perfluorocarbon copolymer composition being substantially insoluble in a solvent or diluent for solvated unbound perfluorocarbon copolymer composition;
    said unexposed portion being sealed with a polymeric composition surrounding said exposed portion.

2. The article of manufacture of claim 1 wherein the unexposed portion is free of deposited perfluorocarbon copolymer composition.

3. The article of manufacture of claim 1 wherein the unexposed portion has deposited thereon a bound perfluorocarbon copolymer composition.

4. The article of manufacture of any one of claims 1, 2 or 3 wherein said porous membrane is a flat sheet.

5. The article of manufacture of any one of claims 1, 2 or 3, wherein said porous membrane is a corrugated sheet.

6. The article of manufacture of any one of claims 1, 2 or 3 wherein said porous membrane comprises at least one hollow fiber.

7. The article of manufacture of any one of claims 1, 2 or 3 wherein said polymeric substrate is a fluorine-containing polymer.

8. The article of manufacture of claim 7 wherein said fluorine-containing polymer is polytetrafluoroethylene.

9. The article of manufacture of claim 7, wherein said fluorine-containing polymer is a perfluoroalkoxy polymer.

10. The article of manufacture of claim 7, wherein said fluorine-containing polymer is a fluorinated ethylene-propylene copolymer.

11. The article of manufacture of claim 4 wherein said polymeric substrate is a fluorine-containing polymer.

12. The article of manufacture of claim 11 wherein said fluorine-containing polymer is polytetrafluoroethylene.

13. The article of manufacture of claim 11 wherein said fluorine-containing polymer is a perfluoroalkoxy polymer.

14. The article of manufacture of claim 11, wherein said fluorine-containing polymer is a fluorinated ethylene-propylene copolymer.

15. The article of manufacture of claim 5 wherein said polymeric substrate is a fluorine-containing polymer.

16. The article of manufacture of claim 15 wherein said fluorine-containing polymer is polytetrafluoroethylene.

17. The article of manufacture of claim 15 wherein said fluorine-containing polymer is a perfluoroalkoxy polymer.

18. The article of manufacture of claim 15, wherein said fluorine-containing polymer is a fluorinated ethylene-propylene copolymer.

19. The article of manufacture of claim 6 wherein said polymeric substrate is a fluorine-containing polymer.

20. The article of manufacture of claim 19 wherein said fluorine-containing polymer is polytetrafluoroethylene.

21. The article of manufacture of claim 19 wherein said fluorine-containing polymer is a perfluoroalkoxy polymer.

22. The article of manufacture of claim 19, wherein said fluorine-containing polymer is a fluorinated ethylene-propylene copolymer.

23. The article of manufacture of any one of claims 1, 2 or 3 wherein the polymeric composition is a fluorine-containing polymer.

24. The article of manufacture of claim 23 wherein the fluorine-containing polymer is polytetrafluoroethylene.

25. The article of manufacture of claim 23 wherein the fluorine-containing polymer is a perfluoroalkoxy polymer.

26. The article of manufacture of claim 23 wherein the fluorine-containing polymer is a fluorinated ethylene-propylene copolymer.

27. The article of manufacture of any one of claims 1, 2 or 3 wherein the perfluorocarbon copolymer composition contains at least one of the following groups ($SO_2F$), ($SO_3M$), ($SO_3R$), ($SO_2NR_2$), (COF), ($CO_2M$), ($CO_2R$) or ($CONR_2$), wherein M is H, an alkali metal, an alkaline earth metal, or $NR_4$ and each R separately is H, an alkyl group or an aryl group, or a substituted alkyl or substituted aryl group.

28. The article of manufacture of claim 4 wherein the perfluorocarbon copolymer composition contains at least one of the following groups ($SO_2F$), ($SO_3M$), ($SO_3R$), ($SO_2NR_2$), (COF), ($CO_2M$), ($CO_2R$) or ($CONR_2$), wherein M is H, an alkali metal, an alkaline earth metal, or $NR_4$ and each R separately is H, an alkyl group or an aryl group, or a substituted alkyl or substituted aryl group.

29. The article of manufacture of claim 5 wherein the perfluorocarbon copolymer composition contains at least one of the following groups ($SO_2F$), ($SO_3M$), ($SO_3R$), ($SO_2NR_2$), (COF), ($CO_2M$), ($CO_2R$) or ($CONR_2$), wherein M is H, an alkali metal, an alkaline earth metal, or $NR_4$ and each R separately is H, an alkyl group or an aryl group, or a substituted alkyl or substituted aryl group.

30. The article of manufacture of claim 6 wherein the perfluorocarbon copolymer composition contains at least one of the following groups ($SO_2F$), ($SO_3M$), ($SO_3R$), ($SO_2NR_2$), (COF), ($CO_2M$), ($CO_2R$) or ($CONR_2$), wherein M is H, an alkali metal, an alkaline earth metal, or $NR_4$ and each R separately is H, an alkyl group or an aryl group, or a substituted alkyl or substituted aryl group.

31. A filtration process for purifying an outgassing impure liquid which comprises passing said outgassing impure liquid through the porous membrane of the article of manufacture of any one of claims 1, 2 or 3 and recovering a purified liquid.

32. The process of claim 31 wherein said impure liquid is an aqueous liquid.

33. The process of claim 31 wherein the porous membrane has a pore size of about 0.2 micron or less.

34. The process of claim 32 wherein the porous membrane has a pore size of about 0.2 micron or less.

* * * * *